United States Patent
Lee et al.

(10) Patent No.: US 10,496,149 B2
(45) Date of Patent: Dec. 3, 2019

(54) METHOD OF OPERATING CPU AND METHOD OF OPERATING SYSTEM HAVING THE CPU

(71) Applicant: SAMSUNG ELECTRONICS CO., LTD., Suwon-si, Gyeonggi-do (KR)

(72) Inventors: Gyeong Taek Lee, Suwon-si (KR); Ji Eun Park, Hwaseong-si (KR); Seung Kyu Kim, Sejong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 73 days.

(21) Appl. No.: 15/251,373

(22) Filed: Aug. 30, 2016

(65) Prior Publication Data
US 2017/0060222 A1 Mar. 2, 2017

(30) Foreign Application Priority Data

Aug. 31, 2015 (KR) ........................ 10-2015-0122353

(51) Int. Cl.
| G06F 1/3206 | (2019.01) |
| G06F 1/3228 | (2019.01) |
| G06F 1/324 | (2019.01) |
| G06F 1/329 | (2019.01) |
| G06F 1/3296 | (2019.01) |
| G06F 1/3234 | (2019.01) |
| G06F 9/50 | (2006.01) |

(52) U.S. Cl.
CPC ............ *G06F 1/3206* (2013.01); *G06F 1/324* (2013.01); *G06F 1/329* (2013.01); *G06F 1/3228* (2013.01); *G06F 1/3243* (2013.01); *G06F 1/3296* (2013.01); *G06F 9/5094* (2013.01); *Y02D 10/126* (2018.01); *Y02D 10/152* (2018.01); *Y02D 10/172* (2018.01); *Y02D 10/24* (2018.01); *Y02D 50/20* (2018.01)

(58) Field of Classification Search
CPC ...................................................... G06F 1/3206
USPC .................. 702/182; 713/320, 323; 718/108
See application file for complete search history.

(56) References Cited

U.S. PATENT DOCUMENTS

| 7,882,379 B2 | 2/2011 | Kanakogi |
| 8,321,614 B2 | 11/2012 | Wolfe |
| 8,381,004 B2 | 2/2013 | Elnozahy et al. |
| 8,560,869 B2 | 10/2013 | Allarey |

(Continued)

FOREIGN PATENT DOCUMENTS

JP 2007-334497 A 12/2007

*Primary Examiner* — Aurel Prifti
(74) *Attorney, Agent, or Firm* — Volentine, Whitt & Francos, PLLC

(57) ABSTRACT

A method of operating a CPU including a memory for storing a load tracker and a booster and a core for executing the load tracker and the booster includes determining, by the load tracker, whether an idle task is executed in the core, generating, by the load tracker, an event corresponding to a result of the determination, broadcasting, by the load tracker, a generated event to the booster, and setting, by the booster, a QoS minimum value of the core based on the event. The method of operating a CPU may further include registering, by the load tracker, an idle start worker callback and an idle end worker callback in an idle module when the CPU is initialized, and generating, by the load tracker, an idle start worker and an idle end worker when the CPU is initialized.

14 Claims, 17 Drawing Sheets

(56) References Cited

U.S. PATENT DOCUMENTS

| | | | |
|---|---|---|---|
| 2011/0119682 A1* | 5/2011 | Hsu | G06F 11/3423 |
| | | | 718/107 |
| 2011/0145615 A1 | 6/2011 | Rychlik et al. | |
| 2012/0053897 A1* | 3/2012 | Naffziger | G06F 1/3206 |
| | | | 702/182 |
| 2013/0074085 A1 | 3/2013 | Thomson et al. | |
| 2014/0115368 A1 | 4/2014 | Muralidhar et al. | |
| 2014/0173311 A1* | 6/2014 | Park | G06F 1/206 |
| | | | 713/320 |
| 2014/0325247 A1* | 10/2014 | Sodhi | G06F 1/26 |
| | | | 713/320 |
| 2015/0106642 A1 | 4/2015 | Naffziger et al. | |
| 2015/0317762 A1* | 11/2015 | Park | G06T 1/20 |
| | | | 345/505 |
| 2015/0346809 A1* | 12/2015 | Kumar | G06F 1/3293 |
| | | | 713/323 |
| 2017/0010946 A1* | 1/2017 | Orakwue | G06F 11/3409 |
| 2017/0031415 A1* | 2/2017 | Allen-Ware | G06F 1/324 |

\* cited by examiner

FIG. 17

```
data->idle_notifier_block.notifier_call = load_tracker_idle_notifier;
idle_notifier_register(&data->idle_notifier_block);
```

FIG. 18

```
static int load_tracker_idle_notifier(struct notifier_block *nb,
        unsigned long action,
        void *data)
{
    switch (action) {
    case IDLE_START:
        cancel_delayed_work(&end_work->delayed_work);
        schedule_delayed_work(&start_work->delayed_work, busy_end_timeout_jiffies);
        break;
    case IDLE_END:
        schedule_delayed_work(&end_work->delayed_work, busy_start_timeout_jiffies);
        break;
    }
    return NOTIFY_OK;
}
```

METHOD OF OPERATING CPU AND METHOD OF OPERATING SYSTEM HAVING THE CPU

CROSS-REFERENCE TO RELATED APPLICATION

This application claims priority under 35 U.S.C. § 119 from Korean Patent Application No. 10-2015-0122353 filed on Aug. 31, 2015 the disclosure of which is hereby incorporated by reference in its entirety.

BACKGROUND

Embodiments of the present inventive concept relate to a method of operating a central processing unit (CPU), and more particularly to the method of operating a CPU capable of adjusting a quality of service (QoS) of the CPU, and a method of operating a system including the CPU.

A microprocessor, particularly, a mobile application processor uses a technology of dynamically changing an operating frequency, for example, a dynamic frequency scaling (DFS) technology or a dynamic voltage and frequency scaling (DVFS) technology, to satisfy demands in both performance and low power. The microprocessor uses various policies for adjusting a frequency of an operating clock signal. A mobile environment may impose a limit on the amount of power to be used and may create vulnerability to heat, and thus the policies constrain performance of a microprocessor, and the microprocessor is designed to minimize power consumption and heat generation.

A DVFS governor of the DVFS used in a microprocessor of the prior art is optimized for limiting the power consumed in the microprocessor, such that an operating frequency of the microprocessor is not immediately increased to a maximum operating frequency even if a certain task continuously uses the maximum available performance of the microprocessor.

SUMMARY

A technical object of the present inventive concepts is to provide a method of operating a CPU which can automatically sense when high performance is urgently required and can automatically set a QoS minimum value according to a result of the sensing, and a method of operating a system including the CPU.

An example embodiment of the present inventive concepts is directed to a method of operating a CPU including a first memory for storing a first load tracker and a booster, and a first core for executing the first load tracker and the booster, wherein the method includes determining, by the first load tracker, whether a first idle task is executed in the first core, generating, by the first load tracker, a first event corresponding to a result of the determination, broadcasting, by the first load tracker, a generated first event to the booster, and setting, by the booster, a quality of service (QoS) minimum value of the first core based on the first event.

The method of operating a CPU may further include: registering when the CPU is initialized, by the first load tracker, an idle start worker callback and an idle end worker callback in an idle module; and generating when the CPU is initialized, by the first load tracker, an idle start worker and an idle end worker when the CPU is initialized.

The method of operating a CPU may further include setting when the CPU is initialized, by the booster, a first expiry time of the idle start worker and a second expiry time of the idle end worker.

The method may further include: calling, by the idle module, the idle start worker callback when the first idle task is executed; and calling, by the idle module, the idle end worker callback when the first idle task is ended.

The method may further include: scheduling, by the idle start worker callback, the idle start worker when the first idle task is executed; and scheduling, by the idle end worker callback, the idle end worker when the first idle task is ended.

The method may further include canceling, by the idle start worker callback, a schedule of a previous idle end worker existing in a work queue when the first idle task is executed.

The generating by the first load tracker of the first event may include: generating, by the idle start worker, the first event instructing a decrease in the QoS minimum value when the first expiry time is elapsed; and canceling, by the idle end worker, a schedule of the idle start worker and generating the first event instructing an increase in the QoS minimum value when the second expiry time is elapsed.

The method of operating a CPU may further include: outputting, by the booster, control signals for dynamic voltage frequency scaling (DVFS) of the first core to a QoS controller based on a set QoS minimum value; and generating, by the QoS controller, a frequency control signal related to a frequency control of an operating clock signal of the first core and a voltage control signal related to a control of an operating voltage of the first core in response to the control signals.

The CPU may further include a second memory for storing a second load tracker and a second core for executing the second load tracker, and the method of operating a CPU may further include: determining, by the second load tracker, whether a second idle task is executed in the second core; generating, by the second load tracker, a second event corresponding to a result of the determination; broadcasting, by the second load tracker, a generated second event to the booster executed in the first core; and setting, by the booster, a QoS minimum value of the first core and a QoS minimum value of the second core based on the first event and the second event.

The method of operating a CPU may further include compulsorily assigning a task assigned to the first core to the second core based on a set QoS minimum value of the first core and a set QoS minimum value of the second core.

An example embodiment of the present inventive concepts is directed to a method of operating a system on chip which includes: a CPU having a first memory for storing a first load tracker, a booster, and a QoS controller, and further having a first core for executing the first load tracker, the booster, and the QoS controller; a clock management unit; and a power management unit. The method of operating a system on chip includes: determining, by the first load tracker, whether a first idle task is executed in the first core; generating, by the first load tracker, a first event corresponding to a result of the determination; broadcasting, by the first load tracker, a generated first event to the booster; setting, by the booster, a quality of service (QoS) minimum value of the first core based on the first event; generating, by the QoS controller, a frequency control signal and a voltage control signal; and controlling, by the clock management unit, a first frequency of a first clock signal supplied to the first core in response to the frequency control signal, and generating, by the power management unit, a control signal for controlling a power management IC for supplying a first operation voltage to the first core in response to the voltage control signal.

The method of operating a system on chip may further include: registering when the CPU is initialized, by the first load tracker, an idle start worker callback and an idle end worker callback in an idle module; and generating when the CPU is initialized, by the first load tracker, an idle start worker and an idle end worker.

The method may further include: calling, by the idle module, the idle start worker callback when the first idle task is executed; and calling, by the idle module, the idle end worker callback when the first idle task is ended.

The method may further include: canceling, by the idle start worker callback, a schedule of a previous idle end worker existing in a work queue when the first idle task is executed; determining, by the idle start worker callback, a schedule prerequisite of the idle start worker; and scheduling, by the idle start worker callback, the idle start worker when the schedule prerequisite is satisfied. The schedule prerequisite may include a case in which neither the idle start worker nor the idle end worker are pending; and may include a case in which the idle start worker is not pending and the first core is boosted.

The method may further include: determining, by the idle end worker callback, a schedule prerequisite of the idle end worker when the first idle task is ended; and scheduling, by the idle end worker callback, the idle end worker when the schedule prerequisite is satisfied. The schedule prerequisite may include a case in which the idle end worker is not pending and the idle start worker is pending, and may include a case in which the idle end worker is not pending and the first core is not boosted.

The CPU may further include a second memory for storing a second load tracker and a second core for executing the second load tracker, and the method may further include: determining, by the second load tracker, whether a second idle task is executed in the second core; generating, by the second load tracker, a second event corresponding to a result of the determination; broadcasting, by the second load tracker, the generated second event to the booster executed in the first core; setting, by the booster, a set QoS minimum value of the first core and a set QoS minimum value of the second core based on the first event and the second event; outputting, by the QoS controller, the frequency control signal and the voltage control signal based on the set QoS minimum value of the first core and the set QoS minimum value of the second core; controlling, by the clock management unit, the first frequency and a second frequency of a second clock signal supplied to the second core in response to the frequency control signal; and outputting, by the power management unit, the control signal for controlling the power management IC for supplying the first operation voltage and a second operation voltage to the second core in response to the voltage control signal.

An example embodiment of the present inventive concepts is directed to a method of operating a computing system which includes: a CPU having a first memory for storing a first load tracker, a booster, and a QoS controller, and further having a first core for executing the first load tracker, the booster, and the QoS controller; a clock management unit; a power management unit, and a power management IC, and the method includes: determining, by the first load tracker, whether a first idle task is executed in the first core; generating, by the first load tracker, a first event corresponding to a result of the determination; broadcasting, by the first load tracker, a generated first event to the booster; setting, by the booster, a QoS minimum value of the first core based on the first event; generating, by the QoS controller, a first frequency control signal and a first voltage control signal based on a set QoS minimum value; controlling, by the clock management unit, a first frequency of a first clock supplied to the first core in response to the first frequency control signal; outputting, by the power management unit, a first control signal to the power management IC in response to the first voltage control signal; and controlling, by the power management IC, a first operating voltage supplied to the first core in response to the first control signal.

The method of operating a computing system may further include: registering when the CPU is initialized, by the first load tracker, an idle start worker callback and an idle end worker callback in an idle module; and generating when the CPU is initialized, by the first load tracker, an idle start worker and an idle end worker.

The CPU further includes a second memory for storing a second load tracker and a second core for executing the second load tracker, and the method of operating the computing system further includes: determining, by the second load tracker, whether a second idle task is executed in the second core; generating, by the second load tracker, a second event corresponding to a result of the determination; broadcasting, by the second load tracker, a generated second event to the booster executed in the first core; setting, by the booster, a QoS minimum value of the first core and a QoS minimum value of the second core based on the first event and the second event; generating, by the QoS controller, a second frequency control signal and a second voltage control signal based on a set QoS minimum value of the first core and a set QoS minimum value of the second core; controlling, by the clock management unit, the first frequency of the first clock signal supplied to the first core and a second frequency of a second clock signal supplied to the second core in response to the second frequency control signal; outputting, by the power management unit, a second control signal to the power management IC in response to the second voltage control signal; and controlling, by the power management IC, the first operating voltage supplied to the first core and a second operating voltage supplied to the second core in response to the second control signal.

An example embodiment of the present inventive concepts is directed to a method which includes: a central processing unit (CPU) monitoring a status of a first idle task of a first core of the CPU; setting a boosting level for the CPU based at least in part on the monitored status of the first idle task of the first core of the CPU; and controlling, by a clock management unit, a first frequency of a first operating signal of the first core in response to the boosting level.

The method may also include: the central processing unit (CPU) monitoring a status of a second idle task of a second core of the CPU; setting the boosting level for the CPU based at least in part on the monitored status of the first idle task of the first core of the CPU and the monitored status of the second idle task of the second core of the CPU; and controlling, by the clock management unit, the first frequency of the first operating clock signal of the first core and a second frequency of a second operating clock signal of the second core in response to the boosting level.

The method of may also include: setting a quality of service (QoS) minimum value of the first core based on the monitored status of the first idle task of the first core of the CPU; and controlling a first operating voltage supplied to the first core in response to the QoS minimum value of the first core.

The method of may also include: the central processing unit (CPU) monitoring a status of a second idle task of a second core of the CPU; setting a quality of service (QoS)

minimum value of the second core of the CPU based on the monitored status of the second idle task of the second core of the CPU; and controlling a second operating voltage supplied to the second core in response to the QoS minimum value of the second core.

A computer may include the CPU, at least one memory interface for communicating with at least one memory device, and at an input/output interface. In that case, the method may also include adjusting at least one of: a frequency of a memory interface clock of the memory interface, and a frequency of an I/O clock of the I/O interface, in response to the boosting level.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 17 is an exemplary embodiment of program code for describing a process of registering an idle worker callback in an idle module shown in FIG. 3. and FIG. 18 is an exemplary embodiment of program code for describing a schedule process and a cancellation process of an idle start worker and an idle end worker in the idle worker callback registered in the idle module shown in FIG. 3.

DETAILED DESCRIPTION OF THE EMBODIMENTS

Figure 1:
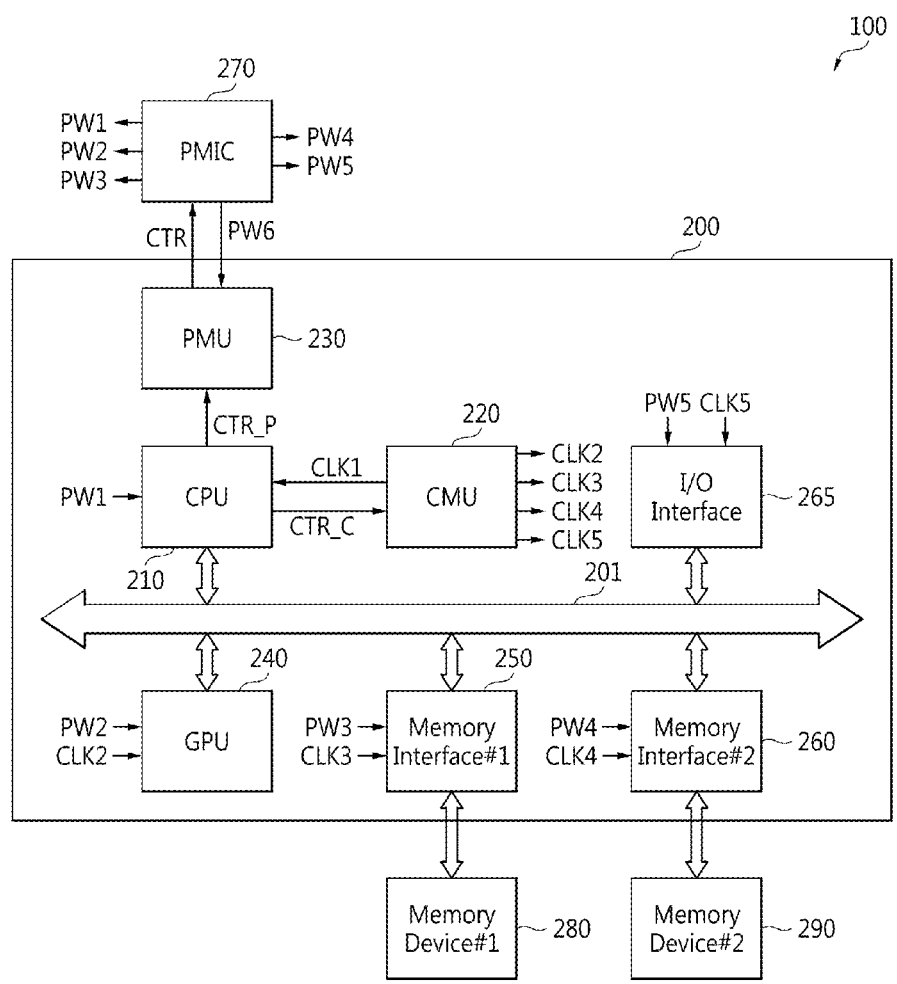
FIG. 1 is a block diagram of a computer system according to an exemplary embodiment of the present inventive concepts.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Exemplary embodiments according to the present inventive concepts relate to methods of improving performance of a central processing unit (CPU). According to exemplary embodiments, the CPU may include one or more cores. According to exemplary embodiments, each of the cores may share one semiconductor substrate (or one semiconductor chip), and may be embodied in different semiconductor chips. Here, a core may refer to a processor or a processor core.

Setting a quality of server (QoS) minimum value of a CPU, or a computer system including the CPU, according to whether an idle task is executed herein may refer to operations for improving performance of the CPU or the computer system. The setting of a QoS minimum value herein may include a setting of a boosting level of a CPU or a computer system including the CPU. Here, the setting may include a change of a program of a specific value or the specific value. When a scheduler is called, if there is no task in a ready state, an idle task may be executed. Here, QoS may refer to a dynamic voltage and frequency scaling (DVFS), and a QoS minimum value may refer to at least one of a minimum operating frequency and a minimum operating voltage of the DVFS.

A DVFS governor may be executed by an operating system (OS) as a module (for example, software or a software component) which changes an operating frequency of a CPU (or core). Boosting may refer to an operation of ignoring a management of the DVFS governor or a default value of the DVFS governor, and rapidly increasing an operating frequency and/or an operating voltage of the CPU (or the core).

Accordingly, a boosted core may operate at a maximum operating frequency (or an operating frequency corresponding to a maximum operating frequency) of DVFS and/or a maximum operating voltage (or an operating voltage corresponding to a maximum operating voltage). For example, when the CPU executes a benchmark program, boosting for the CPU may be required.

Boosting herein may include scheduler boosting and heterogeneous multiprocessor architectures (HMP) boosting. The scheduler boosting may refer to an operation of maximizing throughput of a CPU by changing one or more parameters of a scheduler. For example, the parameter(s) of a scheduler may include nice, balance interval, and HZ; however, it is not limited thereto. For example, the nice may refer to running a program with a modified scheduling priority, the balance interval may refer to an interval for load balancing through task re-assignment among CPUs or cores, and HZ may refer to the number of clock ticks per second.

The HMP boosting may refer to an operation of compulsorily assigning a task assigned to a low-power core (for example, a little core) to a high-performance core (for example, a big core).

A booster according to exemplary embodiments of the present inventive concepts may receive an event output from at least one load tracker, and control a start and an end of a boosting operation, a change of a boosting level, and/or operations dependent on a processor (or OS executed by the processor) related to a boost based on a received event.

A schedule herein may refer to an operation of writing a timeout value and a start address in a work queue, and a cancel of the schedule may refer to an operation of erasing the timeout value and the start address written in the work queue.

FIG. 1 is a block diagram of a computer system 100 according to an exemplary embodiment of the present inventive concepts. Referring to FIG. 1, computer system 100 may include a control circuit 200, a power management IC (PMIC) 270, a first memory device 280, and a second memory device 290.

Computer system 100 may be embodied in a personal computer (PC) or a mobile device. For example, the mobile device may be embodied in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book. However, it is not limited thereto.

Control circuit 200 may control operations of power management IC 270, first memory device 280, and second memory device 290. Control circuit 200 may be embodied in an integrated circuit (IC), a motherboard, a system on chip (SoC), a microprocessor, an application processor (AP), a mobile AP, a chip set, a set of semiconductor chips; however, it is not limited thereto.

Control circuit 200 may include a bus 201, a CPU 210, a clock control, or clock management, unit (CMU) 220, a power management unit (PMU) 230, a graphic processing unit (GPU) 240, a first memory interface 250, a second memory interface 260, and an input/output (I/O) interface 265.

Configuration elements 210, 240, 250, 260 and 265 may transmit or receive data to or from each other through the bus 201. Bus 201 may be embodied in an advanced microcontroller bus architecture (AMBA), an advanced high-performance bus (AHB), an advanced peripheral bus (APB), an advanced eXtensible interface (AXI), an advanced system bus (ASB), AXI Coherency Extensions (ACE), or a combination of these; however, it is not limited thereto.

CPU 210 may include one or more cores. CPU 210 may operate using a first operation voltage PW1 and a first clock signal CLK1. CPU 210 may execute software components, for example, a load tracker, a booster, and a QoS controller, to be described herein. According to exemplary embodiments, the load tracker, the booster, and the QoS controller may be embodied in hardware components. According to exemplary embodiments, the load tracker, the booster, and the QoS controller may be stored in memory (e.g., an instruction cache) of CPU 210.

CPU 210 may generate a clock control signal CTR_C and a power control signal CTR_P using the software components (or hardware components), and output the clock control signal CTR_C to CMU 220 and output the power control signal CTR_P to PMU 230. The power control signal CTR_P may be referred to as a voltage control signal.

CMU 220 may control frequencies of respective clock signals CLK1 to CLK5 using the clock control signal CTR_C. The frequencies of respective clock signals CLK1 to CLK5 may be the same as, or different from, each other.

PMU 230 may generate a control signal CTR using a power control signal CTR_P and output the control signal CTR to PMIC 270. PMIC 270 may control levels of respective operation voltages PW1 to PW6 using the control signal CTR. The levels of respective operation voltages PW1 to PW6 may be the same as, or different from, each other.

PMIC 270 may control a level of an operating voltage supplied to each of configuration elements 200, 280, and 290 using the control signal CTR. Control of a frequency or control of a level may include an increase, maintenance, or a decrease. Each of the control signals CTR_C, CTR_P, and CTR may include one or more signals (for example, analog signals or digital signals).

According to control of CMU 220 and PMU 230, a dynamic voltage scaling (DVS), a dynamic frequency scaling (DFS), or a dynamic voltage and frequency scaling (DVFS) for computer system 100 may be performed (or controlled).

GPU 240 may process graphics data using a second operating voltage PW2 and a second clock signal CLK2. The graphics data may include 2D graphics data and/or 3D graphics data.

First memory interface 250 may process (or interface) data transmitted or received between bus 201 and first memory device 280 using a third operating voltage PW3 and a third clock signal CLK3. First memory interface 250 may serve as a memory controller. First memory device 280 may be embodied in a random access memory (RAM), a dynamic RAM (DRAM), or a static RAM (SRAM); however, it is not limited thereto.

Second memory interface 260 may process (or interface) data transmitted or received between bus 201 and second memory device 290 using a fourth operating voltage PW4 and a fourth clock signal CLK4. Second memory interface 260 may serve as a memory controller. Second memory device 290 may be embodied in a non-volatile memory device. The non-volatile memory device may be embodied in a flash-based storage; however, it is not limited thereto. For example, the flash-based storage may be embodied in a solid-state drive or solid-state disk (SSD), an embedded SSD (eSSD), a universal flash storage (UFS), a multimedia card (MMC), an embedded MMC (eMMC), or a managed NAND; however, it is not limited thereto.

Input/output interface 265 may transmit or receive data to or from an external device using a fifth operating voltage PW5 and a fifth clock signal CLK5. Input/output interface 265 may be embodied in a Serial Peripheral Interface (SPI), an Inter Integrated Circuit Communications (I2C), a Serial Advanced Technology Attachment (SATA), a SATA express (SATAe), a serial attached small computer system interface (SCSI) (SAS), or an interface capable of supporting a peripheral component interconnect express (PCIe) or a Mobile Industry Processor Interface (MIPI®); however, it is not limited thereto.

Figure 2:
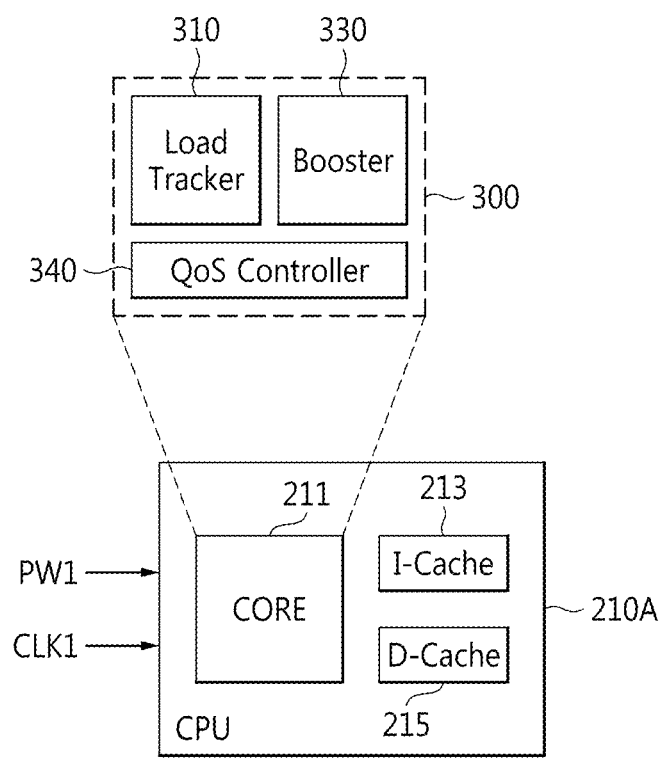
FIG. 2 illustrates an exemplary embodiment of a CPU shown in FIG. 1.

FIG. 2 illustrates a CPU 210A, which may be an exemplary embodiment of CPU 210 shown in FIG. 1. CPU 210A according to an exemplary embodiment of CPU 210 shown in FIG. 1 may include one core 211 and first and second memory devices 213 and 215. Core 211 may control an operation of each of the first and second memory devices 213 and 215. First memory device 213 may comprise an instruction cache 213, and second memory device 215 may comprise a data cache 215. Although level-one caches 213 and 215 are shown in FIG. 2, each of the caches 213 and 215 may be embodied in a level-two cache.

Also shown in FIG. 2 is a QoS control module 300 according to exemplary embodiments of the present inventive concepts. QoS control module 300 may include a load tracker 310, a booster 330, and a QoS controller 340. QoS control module 300 may further include configuration elements 337, 350, and 380, shown in FIG. 3.

QoS control module 300 may adjust a QoS of CPU 210A without correcting a DFS policy or a DVFS policy in which power is optimized by automatically sensing an execution of a benchmark program when a high performance is urgently required, such as when the benchmark program is executed, and increasing performance of CPU 210/210A, control circuit 200 or computer system 100. The policy may be referred to as a governor.

QoS control module 300 may sense an occurrence of a load or a task based on an interrupt without relying on a periodic polling. The interrupt may be generated by a user input to computer system 100, an output of a timer, and a signal output from another core. QoS control module 300 may sense a time when core 211 operates without a rest and a time when core 211 rests based on an interrupt without polling.

Figure 3:
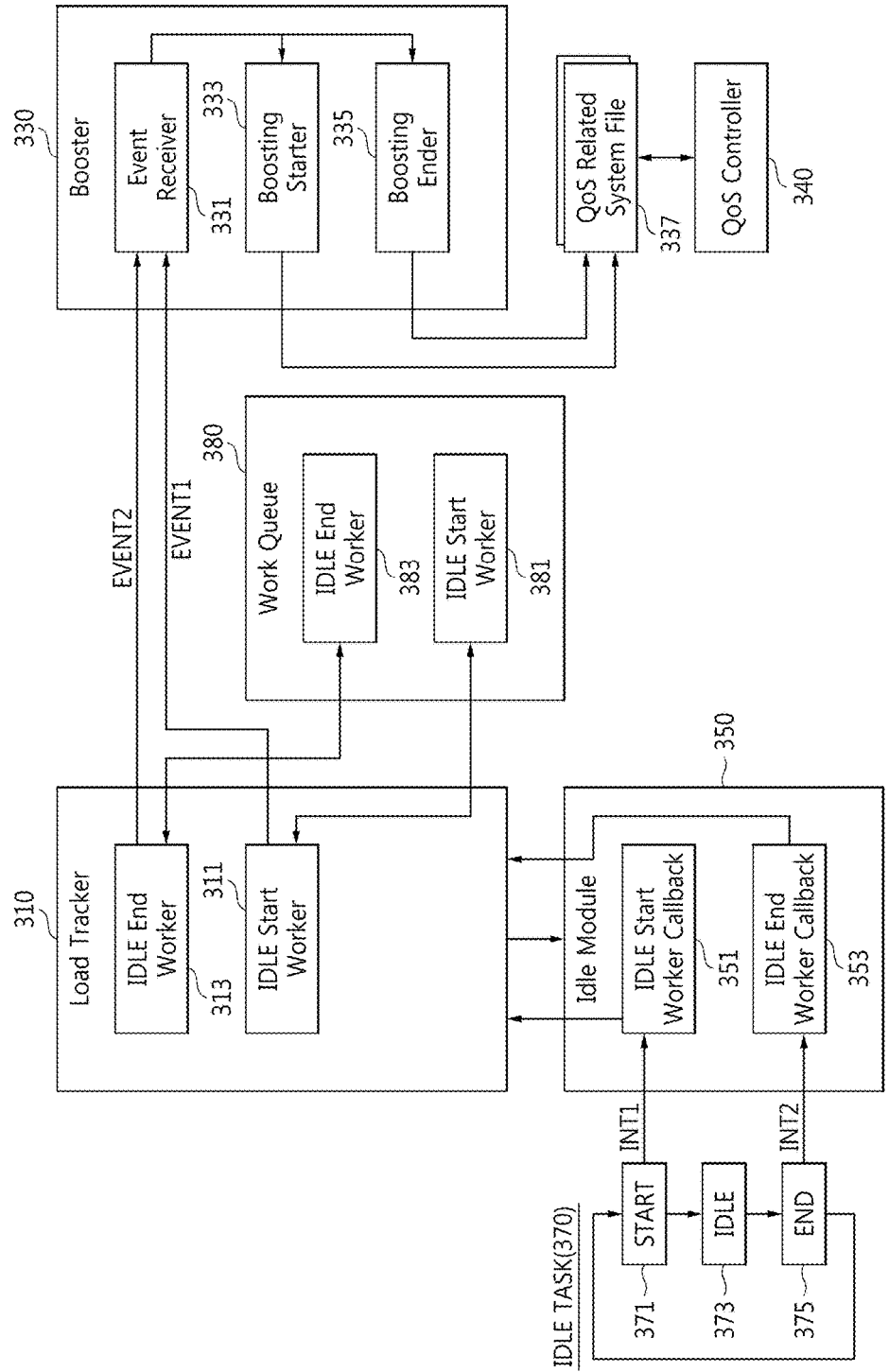
FIG. 3 shows software components executed by the CPU shown in FIG. 1.

FIG. 3 shows software components executed by CPU 210 shown in FIG. 1. As noted above, QoS control module 300 may include load tracker 310, booster 330, and QoS controller 340—all of which are shown in FIG. 3. According to exemplary embodiments, QoS control module 300 may further include a QoS related system file 337, an idle module 350, and a work queue 380—also shown in FIG. 3. Load tracker 310 may determine whether an idle task 370 is executed in core 211, generate an event EVENT1 or EVENT2 corresponding to a result of the determination, and broadcast the event EVENT1 or EVENT2 to booster 330. Booster 330 may set a QoS minimum value of core 211 based on the event EVENT1 or EVENT2.

Figure 4:
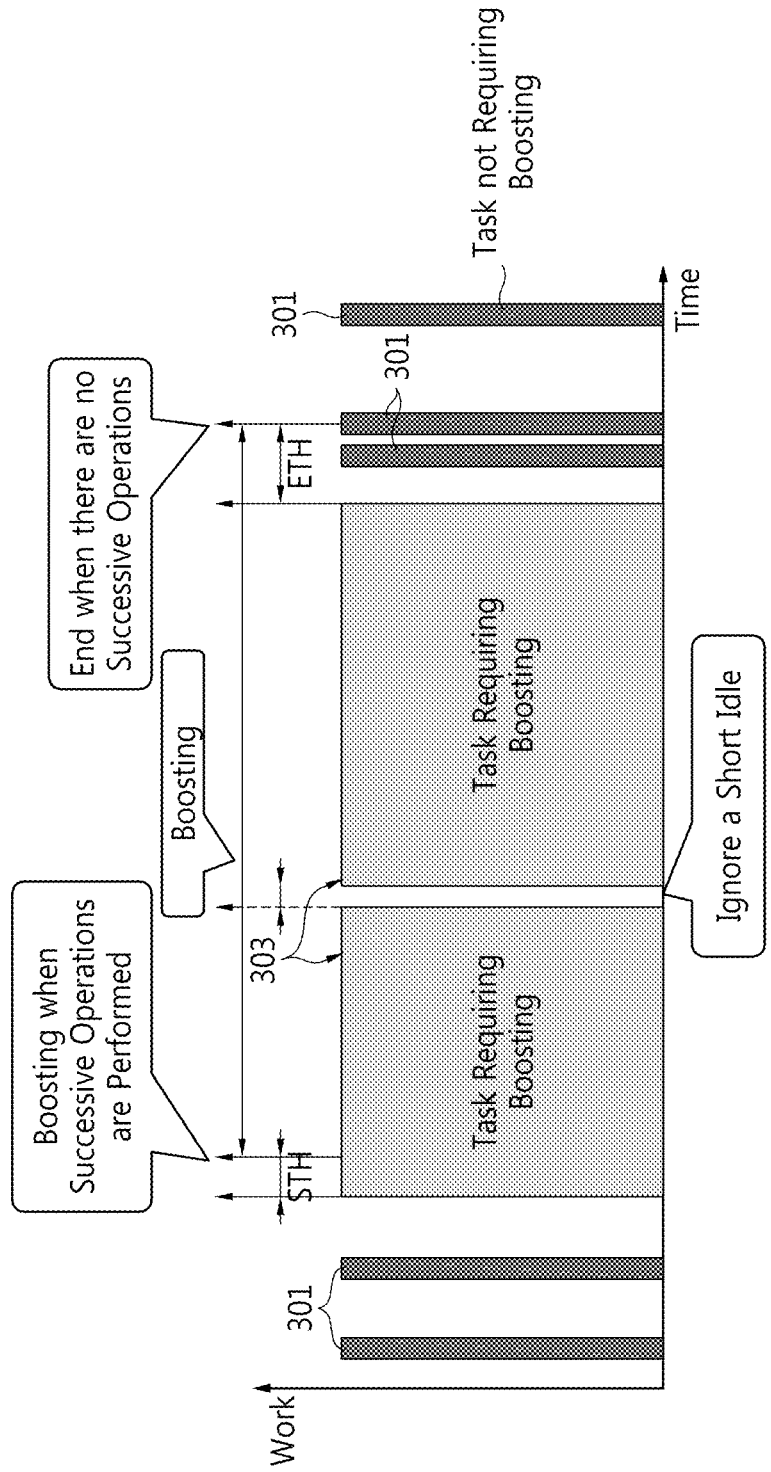
FIG. 4 is a conceptual diagram for describing boosting according to exemplary embodiment of the present inventive concepts.

FIG. 4 is a conceptual diagram for describing boosting according to exemplary embodiments of the present inventive concepts.

Referring to FIG. 4, a reference numeral 301 refers to a task which does not require boosting, and a reference numeral 303 refers to a task which requires boosting. In terms of boosting, STH represents a boosting start threshold time and ETH represents a boosting end threshold time. In terms of an idle task, STH represents a timeout time of an idle end worker or an expiry time of the idle end worker, and ETH represents a timeout time of an idle start worker or an expiry time of the idle start worker.

As shown in FIG. 4, when core 211 executes task 301 which does not require boosting, then core 211 is not boosted. However, when an idle time is short (for example, when the time is shorter than STH) even if core 211 enters into an idle state, then boosting of core 211 may be maintained. That is, QoS control module 300 may set a QoS minimum value when core 211 is boosted.

Figure 5:
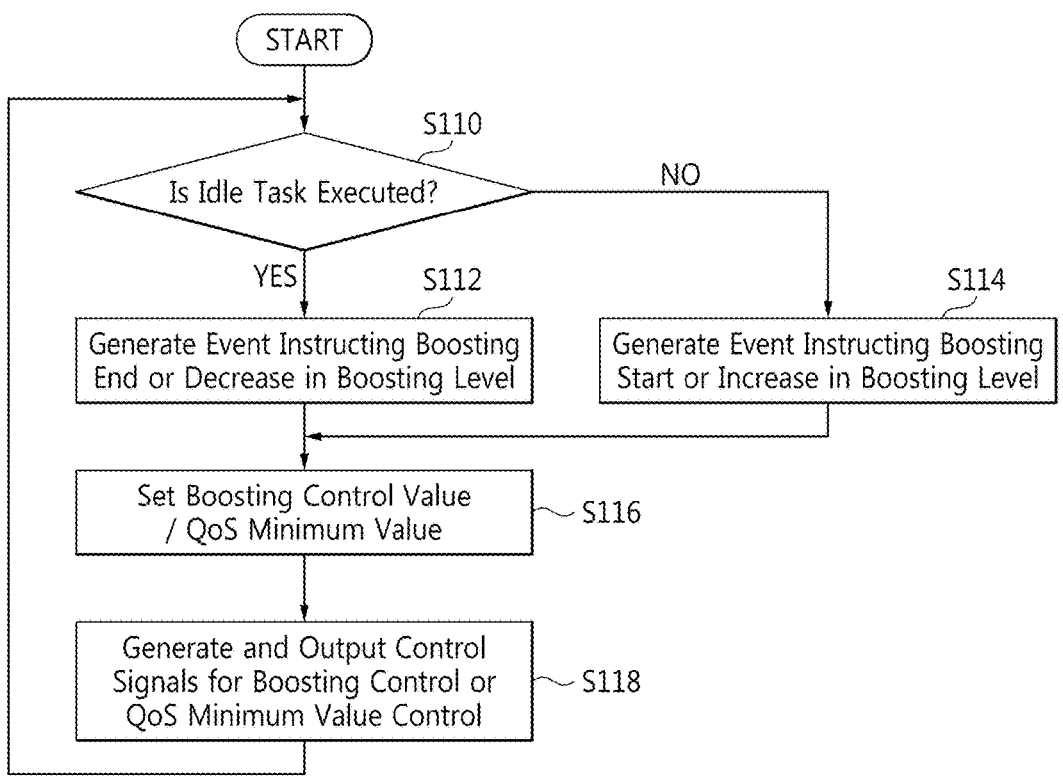
FIG. 5 is a flowchart which describes methods of controlling a QoS minimum value performed by the software components shown in FIG. 3.

FIG. 5 is a flowchart which describes exemplary embodiments of methods of controlling a QoS minimum value which may be performed by the software components shown in FIG. 3. Referring to FIGS. 3 to 5, QoS control module 300 executed by core 211, for example, load tracker 310, may determine whether idle task 370 is executed (S110).

When the idle task 370 is executed (371 of FIG. 3 or YES in S110), then load tracker 310 may generate a decrease instruction event EVENT1 instructing a boosting end or a decrease in a boosting level (S112). When idle task 370 is not executed (NO in S110), for example, when idle task 370 is completed (S375 of FIG. 3), then load tracker 310 may generate an increase instruction event EVENT2 instructing a boosting start or an increase in a boosting level (S114).

QoS control module 300, for example, booster 330, may set a QoS minimum value or a boosting control value for controlling boosting (or a boosting level) in response to the decrease instruction event EVENT1 or the increase instruction event EVENT2 (S116). That is, booster 330 may parse the decrease instruction event EVENT1 or the increase instruction event EVENT2, and store a value(s) corresponding to a result of the parsing in QoS related system file 337. QoS controller 340 may generate control signals for a boosting control or a QoS minimum value control based on a boosting control value or a QoS minimum value stored in the QoS related system file 337 (S118). For example, the control signals may include a frequency control signal CTR_C and a power control signal CTR_P. QoS related system file 337 may refer to a computer file for storing performance-related parameters or a value(s) corresponding to a result of the parsing.

Figure 6:
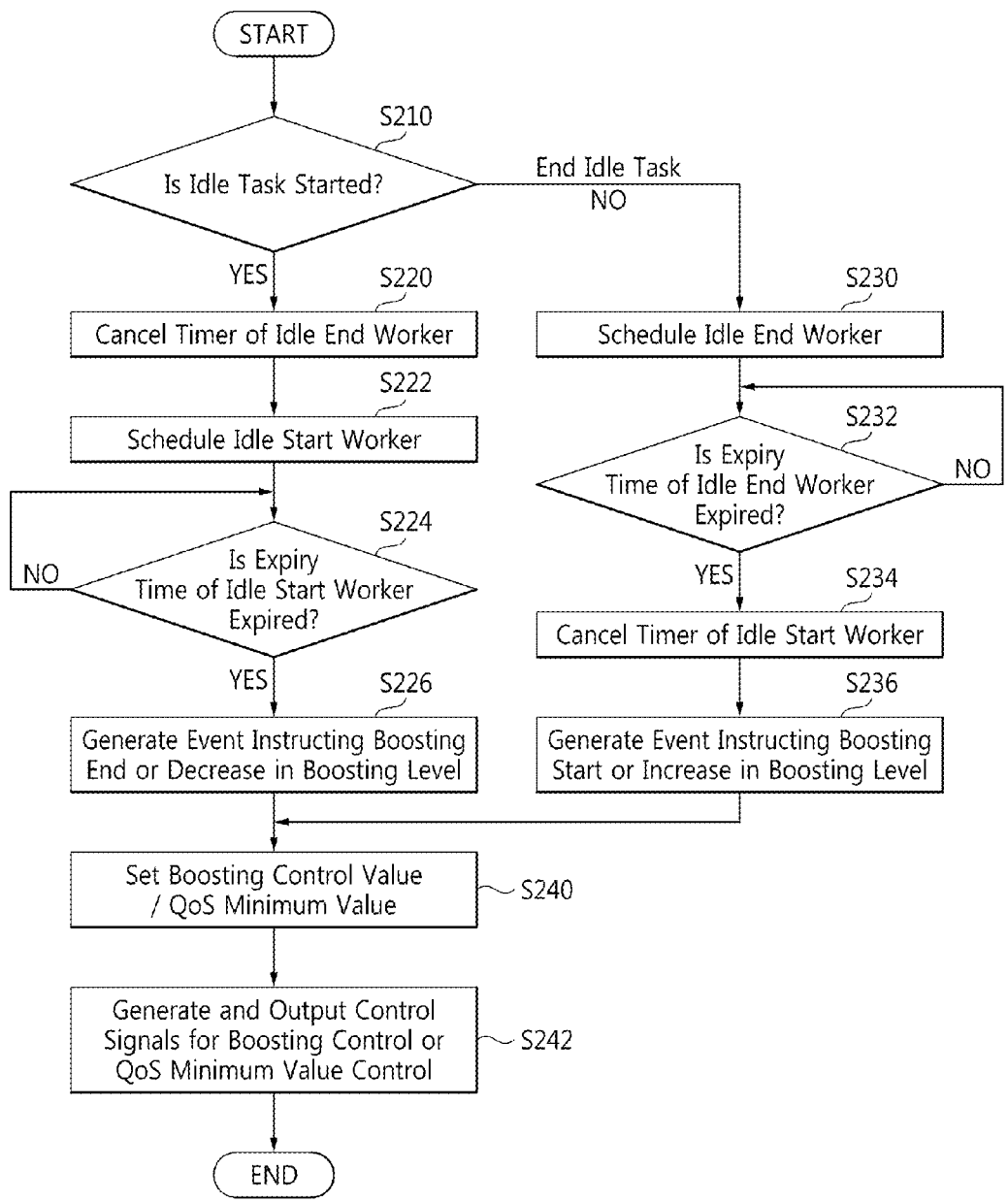
FIG. 6 is a flowchart which describes exemplary embodiments of methods of controlling a QoS minimum value performed by the software components shown in FIG. 3.

FIG. 6 is a flowchart which describes exemplary embodiments of methods of controlling a QoS minimum value which may be performed by the software components shown in FIG. 3. Referring to FIGS. 3 and 6, load tracker 310 may determine whether idle task 370 is started (S210).

When idle task 370 is started (371 of FIG. 3 or YES in S210), then an idle start worker callback 351 stored in idle module 350 may cancel a schedule (or a timeout time or an expiry time of a timer) of a previous idle end worker stored in work queue 380 (S220). However, when the previous idle end worker does not exist in work queue 380, then process S220 may be omitted (or skipped).

Idle start worker callback 351 may schedule an idle start worker 311 (S222). Accordingly, an idle start worker 381 corresponding to idle start worker 311 may be scheduled or queued in work queue 380. For example, idle start worker callback 351 may set a timeout time or an expiry time of a timer of idle start worker 311 or 381.

Work queue 380 may determine whether an expiry time set in idle start worker 381 is expired (or elapsed) (S224). When the expiry time is not expired or elapsed (NO in S224), then work queue 380 may repeat or continuously execute process S224. However, when the expiry time is expired or elapsed (YES in S224), then idle start worker 311 or 381 may generate a decrease instruction event EVENT1 instructing a boosting end or a decrease in a boosting level, and broadcast the decrease instruction event EVENT1 to booster 330 (S226).

Booster 330 may set a QoS minimum value or a boosting control value for controlling a boosting (or a boosting level) in response to the decrease instruction event EVENT1 (S240). That is, booster 330 may parse the decrease instruction event EVENT1 and store a value(s) corresponding to a result of the parsing in QoS related system file 337. QoS controller 340 may generate control signals for a boosting control or a QoS minimum value control based on a boosting control value or a QoS minimum value stored in the QoS related system file 337 (S242). For example, the control signals may include frequency control signal CTR_C and/or power control signal CTR_P.

When idle task 370 in idle state 373 is ended (375 of FIG. 3 or NO in S210), then idle end worker callback 353 stored in idle module 350 may schedule an idle end worker 313 (S230). Accordingly, an idle end worker 383 corresponding to idle end worker 313 may be scheduled or queued in the work queue 380. For example, idle end worker callback 353 may set a timeout time or an expiry time of a timer of idle end worker 383.

Work queue 380 may determine whether an expiry time set in the idle end worker 383 is expired (or elapsed) (S232). When the expiry time is not expired or elapsed (NO in S232), then work queue 380 may repeat or continuously execute process S232.

However, when the expiry time is expired or elapsed (YES in S232), then idle end worker 313 or 383 may cancel a schedule (or a timeout value or an expiry time of a timer) of idle start worker 311 or 381 (S234). Idle end worker 313 or 383 may generate an increase instruction event EVENT2 instructing a boosting start or an increase in a boosting level, and broadcast the increase instruction event EVENT2 to booster 330 (S236).

Booster 330 may set a QoS minimum value or a boosting control value for controlling boosting (or boosting level) in response to the increase instruction event EVENT2 (S240). That is, booster 330 may parse the increase instruction event EVENT2 and store a value(s) corresponding to a result of the parsing in QoS related system file 337. QoS controller 340 may generate control signals for a boosting control or a QoS minimum value control based on a boosting control value or a QoS minimum value stored in QoS related system file 337 (S242). For example, the control signals may include a frequency control signal CTR_C and/or a power control signal CTR_P.

Figure 7:
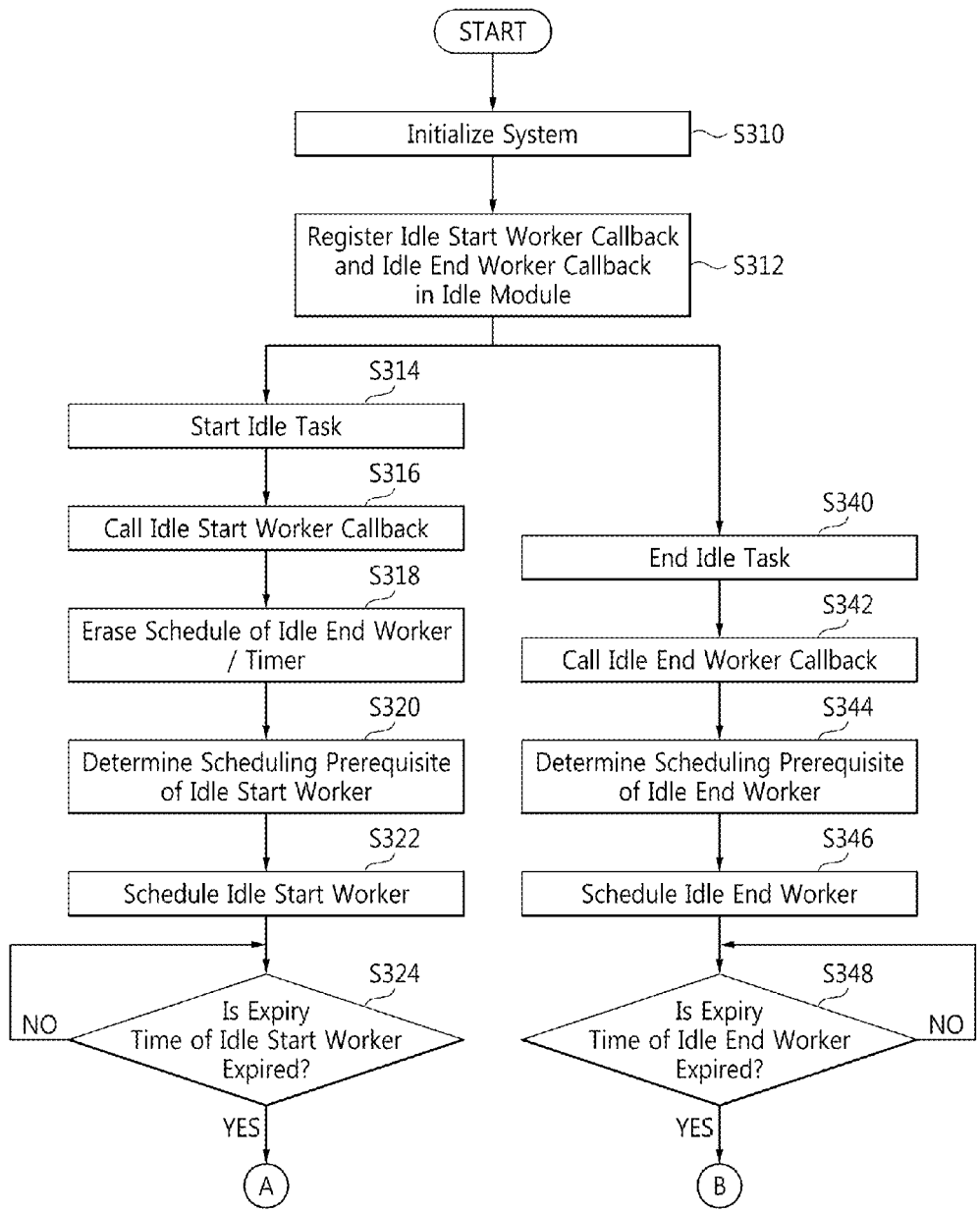
FIGS. 7 and 8 are flowcharts which describe exemplary embodiments of methods of controlling a QoS minimum value performed by the software components shown in FIG. 3.
Figure 8:
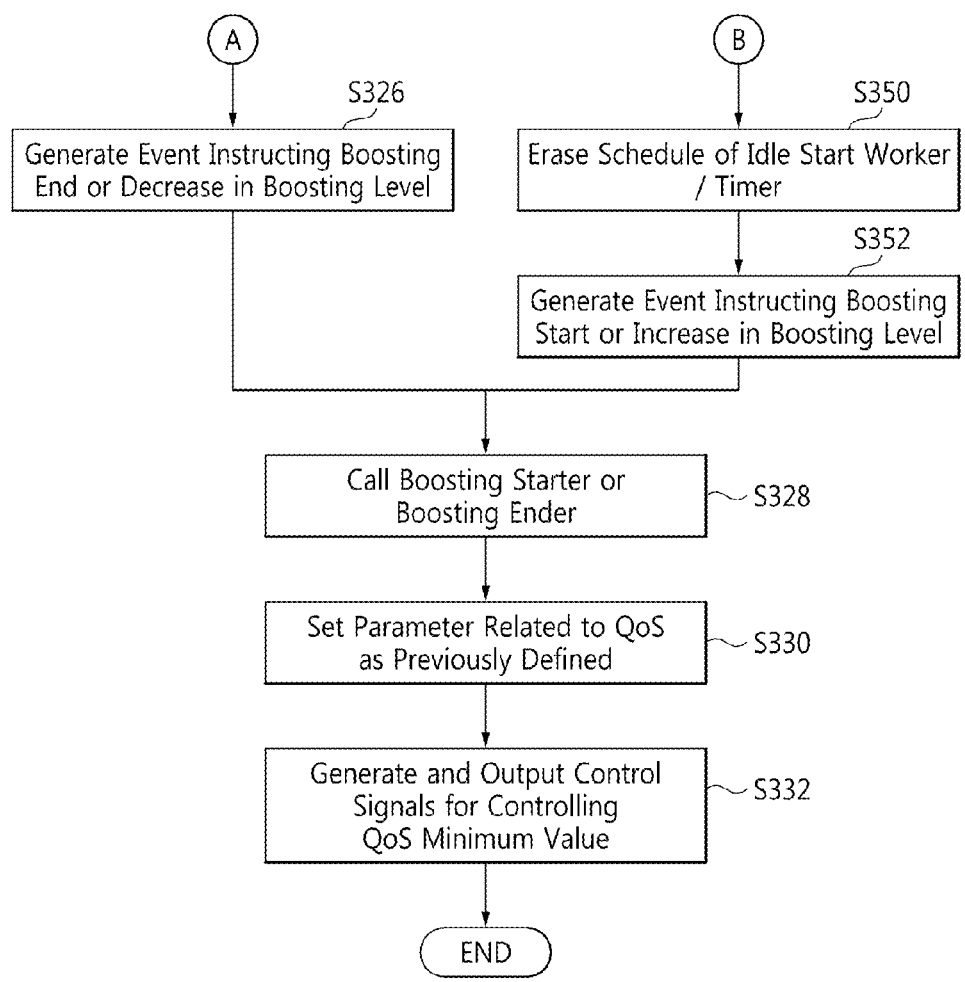

FIGS. 7 and 8 are flowcharts which describe exemplary embodiments of methods of controlling a QoS minimum value which may be performed by the software components shown in FIG. 3.

Referring to FIGS. 1, 3, 7, and 8, when computer system 100 is initialized or booted (S310), then load tracker 310 may register idle callbacks (for example, idle start worker callback 351 and idle end worker callback 353) in idle module 350 (S312). During booting (S310), load tracker 310 may generate idle start worker 311 and the idle end worker 313. During booting (S310), booster 330 may set a timeout time or an expiry time of each of idle start worker 311 and idle end worker 313 generated by load tracker 310.

When idle task 370 is executed (371 of FIG. 3 or S314 of FIG. 7), then idle module 350 may sense an interrupt INT1 generated by execution 371 of idle task 370 and call idle start worker callback 351 (S316).

Idle start worker callback 351 may cancel or erase a schedule (a timeout time or an expiry time set in a timer) of idle end worker (S318) when a queued idle end worker exists in work queue 380. Idle start worker callback 351 may determine schedule prerequisites of idle start worker 311 or 381 (S320), and when the prerequisites are satisfied, then idle start worker callback 351 may schedule idle start worker 311 or 381 (S322).

For example: (1) when an idle start worker is not pending in work queue 380 and an idle end worker is not pending in work queue 380, or (2) when an idle start worker is not pending in work queue 380 and core 211 is boosted, then idle start worker callback 351 may schedule idle start worker 311 or 381 (S322).

Work queue 380 may determine whether an expiry time set in idle start worker 381 is expired (or elapsed) (S324). When the expiry time is not expired or elapsed (NO in S324), then work queue 380 may perform process S324. However, when the expiry time is expired or elapsed (YES in S324), then idle start worker 311 or 381 may generate a decrease instruction event EVENT1 instructing a boosting end or a decrease in a boosting level, and broadcast the decrease instruction event EVENT1 to booster 330 (S326).

An event receiver 331 of booster 330 may call a boosting ender 335 in response to the decrease instruction event EVENT1 (S328). For example, booster 330 may parse the decrease instruction event EVENT1 and call boosting ender 335 according to a result of parsing (S328). Boosting ender 335 may set a QoS related parameter in QoS related system file 337 as pre-defined (S330). QoS controller 340 may generate control signals for a boosting control or a QoS minimum value control based on a boosting control value or a QoS minimum value stored in QoS related system file 337 (S332). For example, the control signals may include a frequency control signal CTR_C and/or a power control signal CTR_P. As idle task 370 is executed, computer system 100 may maintain an idle (or an idle state) of idle task 370 (373 of FIG. 3). When idle task 370 is ended (375 of FIG. 3 or S340 of FIG. 7), then idle module 350 may sense an interrupt INT2 generated by an end (375 of FIG. 3) of idle task 370 and call idle end worker callback 353 (S342).

Idle end worker callback 353 may determine a schedule prerequisite of idle end worker 313 or 383 (S344), and when the prerequisite is satisfied, then idle end worker callback 353 may schedule idle end worker 313 or 383 (S346).

For example: (1) when an idle end worker is not pending in work queue 380 and an idle start worker is pending in work queue 380, or (2) when an idle end worker is not pending in work queue 380 and core 211 is not boosted, then idle end worker callback 353 may schedule idle end worker 313 or 383 (S346).

Work queue 380 may determine whether an expiry time set in idle end worker 383 is expired (or elapsed) (S348). When the expiry time is not expired or elapsed (NO in S348), then work queue 380 may repeat or continuously execute process S348.

However, when the expiry time is expired or elapsed (YES in S348), then idle end worker 313 or 383 may cancel or erase a schedule (or a timeout time or an expiry time set in a timer) of idle start worker (S350) when an idle start worker is queued in work queue 380.

idle end worker 313 may generate an increase instruction event EVENT2 instructing a boosting start or an increase in a boosting level and broadcast the increase instruction event EVENT2 to booster 330 (S352).

An event receiver 331 of booster 330 may call a boosting starter 333 in response to the increase instruction event EVENT2 (S328). For example, booster 330 may parse the increase instruction event EVENT2 and call boosting starter 333 according to a result of the parsing (S328). Boosting starter 335 may set a QoS related parameter in QoS related system file 337 as pre-defined (S330). QoS controller 340 may generate control signals for a boosting control or a QoS minimum value control based on a boosting control value or a QoS minimum value stored in QoS related system file 337 (S332). For example, the control signals may include a frequency control signal CTR_C and/or a power control signal CTR_P.

Figure 9:
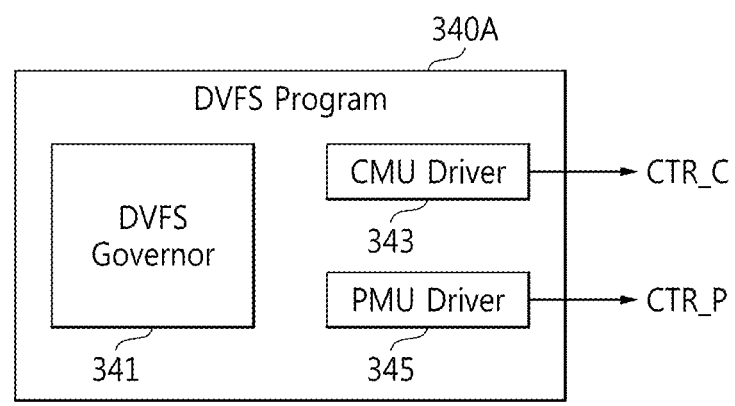
FIG. 9 illustrates an exemplary embodiment of a QoS controller shown in FIG. 2.

FIG. 9 illustrates a QoS controller 340A, which may be an exemplary embodiment of QoS controller 340 shown in FIG. 2. QoS controller 340A according to an exemplary embodiment of QoS controller 340 of FIG. 2 may be embodied in a DVFS program. QoS controller 340A may include a DVFS governor 341, a CMU driver 343, and a PMU driver 345.

DVFS governor 341 may read and analyze a boosting control value or a QoS minimum value from QoS related system file 337, and transmit an analysis value(s) corresponding to a result of the analysis to CMU driver 343 and PMU driver 345. CMU driver 343 may generate a frequency control signal CTR_C based on the analysis value(s) and transmit the frequency control signal CTR_C to CMU 220. PMU driver 345 may generate a power control signal CTR_P based on the analysis value(s) and transmit the power control signal CTR_P to PMU 230.

Figure 10:
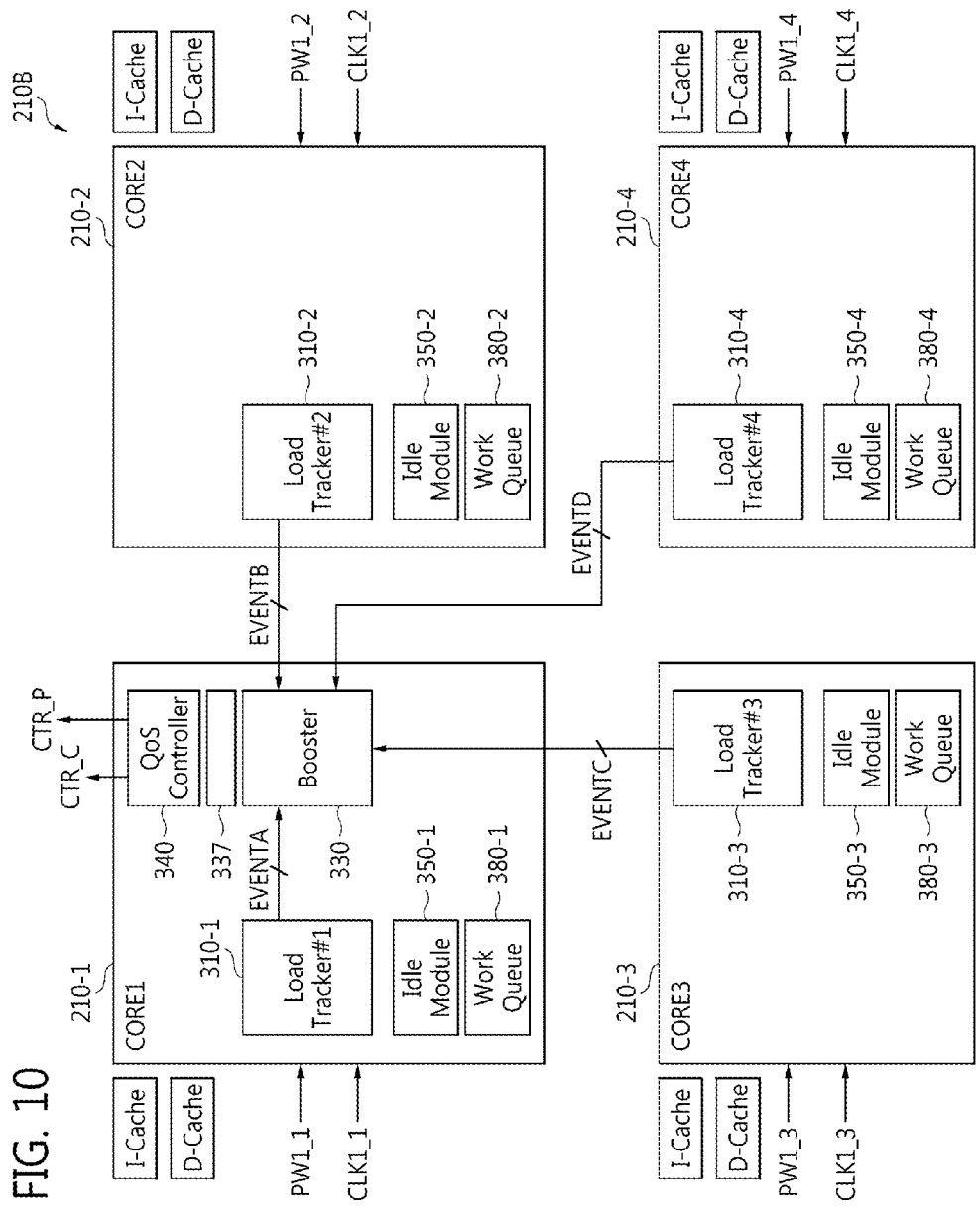
FIG. 10 illustrates an exemplary embodiment of the CPU shown in FIG. 1.

FIG. 10 illustrates a CPU 210B, which may be an exemplary embodiment of CPU 210 shown in FIG. 1. Referring to FIG. 10, it is assumed that CPU 210B includes four cores: first, second, third and fourth cores 210-1, 210-2, 210-3, and 210-4, respectively. However, a technical concept of the present inventive concepts is not limited to the number of cores included in CPU 210B. It is assumed that CPU 210B includes an instruction cache I-Cache and a data cache D-Cache related to each of cores 210-1, 210-2, 210-3, and 210-4, where the I-Caches and D-Caches comprise memory of CPU 210B.

First core 210-1 may include (or execute) a first load tracker 310-1, booster 330, QoS related system file 337, QoS controller 340, an idle module 350-1, and a work queue 380-1. First core 210-1 may operate using a clock signal CLK1_1 and an operating voltage PW1_1. For example, each of configuration elements 310-1, 330, 337, 340, 350-1, and 380-1 may be stored in the instruction-cache I-Cache (i.e., memory) of first core 210-1 and each of configuration elements 310-1, 330, 337, 340, 350-1, and 380-1 may be executed by first core 210-1.

When computer system 100 is initialized (or booted), then first load tracker 310-1 may register a first idle start worker callback and a first idle end worker callback for first core 210-1 in first idle module 350-1, and generate a first idle start worker and a first idle end worker for first core 210-1. When computer system 100 is initialized, then booster 330 may set an expiry time of each of the first idle start worker and the first idle end worker.

When a first idle task is executed in first core 210-1, then first idle module 350-1 may call the first idle start worker callback registered in first idle module 350-1. When the first idle task is executed in first core 210-1, then the first idle start worker callback may cancel a schedule of an idle start worker(s) already existing in first work queue 380-1.

When: (1) an idle start worker is not pending in first work queue 380-1 and an idle end worker is not pending in first work queue 380-1, or (2) an idle start worker is not pending in first work queue 380-1 and first core 210-1 is being boosted, then the first idle start worker callback may schedule the first idle start worker.

First work queue 380-1 may determine whether the expiry time of the first idle start worker is expired (or elapsed). After the expiry time of the first idle start worker is expired (or elapsed), the first idle start worker may decrease a busy core count for first core 210-1 by one, and transmit a decrease instruction event EVENTA to booster 330.

When an execution of the first idle task is ended in first core 210-1, then first idle module 350-1 may call the first idle end worker callback registered in first idle module 350-1.

When: (1) an idle end worker is not pending in first work queue 380-1 and an idle start worker is pending in first work queue 380-1, or (2) an idle end worker is not pending in first work queue 380-1 and first core 210-1 is not being boosted, then the first idle end worker callback may schedule a first idle end worker.

First work queue 380-1 may determine whether an expiry time of the first idle end worker is expired (or elapsed). After the expiry time of the first idle end worker is expired (or elapsed), the first idle end worker may cancel a schedule of an idle start worker scheduled in first work queue 380-1, increase a busy core count for first core 210-1 by one, and transmit an increase instruction event EVENTA to booster 330.

Second core 210-2 may include (or execute) a second load tracker 310-2, an idle module 350-2, and a work queue 380-2. Second core 210-2 may operate using a clock signal CLK1_2 and an operating voltage PW1_2. For example, each of configuration elements 310-2, 350-2, and 380-2 may be stored in an instruction-cache I-Cache (i.e., memory) of second core 210-2, and each of configuration elements 310-2, 350-2, and 380-2 may be executed by second core 210-2 as shown in FIG. 10.

When computer system 100 is initialized (or boosted), a second load tracker 310-2 may register a second idle start worker callback and a second idle end worker callback for a second core 210-2 in a second idle module 350-2, and generate a second idle start worker and a second idle end worker for second core 210-2. When computer system 100 is initialized, then booster 330 of first core 210-1 may set an expiry time of each of the second idle start worker and the second idle end worker.

When a second idle task is executed in second core 210-2, then second idle module 350-2 may call the second idle start worker callback registered in second idle module 350-2. When the second idle task is executed in second core 210-2, then the second idle start worker callback may cancel a schedule of an idle start worker(s) already existing in a second work queue 380-2.

When an idle start worker is not pending in second work queue 380-2 and an idle end worker is not pending in second work queue 380-2, or (2) an idle start worker is not pending in second work queue 380-2 and second core 210-2 is being boosted, then the second idle start worker callback may schedule the second idle start worker.

Second work queue 380-2 may determine whether an expiry time of the second idle start worker is expired (or elapsed). After the expiry time of the second idle start worker is expired (or elapsed), the second idle start worker may decrease a busy core count of second core 210-2 by one and transmit a decrease instruction event EVENTB to booster 330.

When an execution of the second idle task is ended in second core 210-2, second idle module 350-2 may call the second idle end worker callback registered in second idle module 350-2.

When: (1) an idle end worker is not pending in second work queue 380-2 and an idle start worker is pending in second work queue 380-2, or (2) an idle end worker is not pending in second work queue 380-2 and second core 210-2 is not being boosted, then the second idle end worker callback may schedule a second idle end worker.

Second work queue 380-2 may determine whether an expiry time of the second idle end worker is expired (or elapsed). After the expiry time of the second idle end worker is expired (or elapsed), the second idle end worker may cancel a schedule of an idle start worker scheduled in second work queue 380-2, increase a busy core count of second core 210-2 by one, and transmit an increase instruction event EVENTB to booster 330.

Third core 210-3 may include (or execute) a third load tracker 310-3, an idle module 350-3, and a work queue 380-3. Third core 210-3 may operate using a clock signal CLK1_3 and the operating voltage PW1_3. For example, each of configuration elements 310-3, 350-3, and 380-3 may be stored in an instruction-cache I-Cache (i.e., memory) of third core 210-3 and each of configuration elements 310-3, 350-3, and 380-3 may be executed by third core 210-3 as shown in FIG. 10.

When computer system 100 is initialized (or booted), then third load tracker 310-3 may register a third idle start worker callback and a third idle end worker callback for third core 210-3 in a third idle module 350-3, and generate a third idle start worker and a third idle end worker for third core 210-3. When computer system 100 is initialized, then booster 330 may set an expiry time of each of the third idle start worker and the third idle end worker.

When a third idle task is executed in third cord 210-3, then third idle module 350-3 may call the third idle start worker callback registered in third idle module 350-3. When the third idle task is executed in third core 210-3, then the third idle start worker callback may cancel a schedule of an idle start worker(s) already existing in a third work queue 380-3.

When an idle start worker is not pending in third work queue 380-3 and an idle end worker is not pending in third work queue 380-3, or (2) an idle start worker is not pending in third work queue 380-3 and third core 210-3 is being boosted, then the third idle start worker callback may schedule the third idle start worker.

Third work queue 380-3 may determine whether an expiry time of the third idle start worker is expired (or elapsed). After the expiry time of the third idle start worker is expired (or elapsed), the third idle start worker may decrease a busy core count of third core 210-3 by one, and transmit a decrease instruction event EVENTC to booster 330.

When an execution of the third idle task is ended in third core 210-3, then third idle module 350-3 may call the third idle end worker callback registered in third idle module 350-3.

When: (1) an idle end worker is not pending in third work queue 380-3 and an idle start worker is pending in third work queue 380-3, or (2) an idle end worker in not pending in third work queue 380-3 and third core 210-3 is not being boosted, then the third idle end worker callback may schedule the third idle end worker.

Third work queue 380-3 may determine whether an expiry time of the third idle end worker is expired (or elapsed). After the expiry time of the third idle end worker is expired (or elapsed), the third idle end worker may cancel a schedule of an idle start worker scheduled in third work queue 380-3, increase a busy core count of third core 210-3 by one, and transmit an increase instruction event EVENTC to booster 330.

A fourth core 210-4 may include (or execute) a fourth load tracker 310-4, an idle module 350-4, and a work queue 380-4. Fourth core 210-4 may operate using a clock signal CLK1_4 and an operating voltage PW1_4. For example, each of configuration elements 310-4, 350-4, and 380-4 may be stored in an instruction-cache I-Cache (i.e., memory) of fourth core 210-4 and each of configuration elements 310-4, 350-4, and 380-4 may be executed by fourth core 210-4 as shown in FIG. 10.

When computer system 100 is initialized (or booted), then fourth load tracker 310-4 may register a fourth idle start worker callback and a fourth idle end worker callback for fourth core 210-4 in a fourth idle module 350-4, and generate a fourth idle start worker and a fourth idle end worker for fourth core 210-4. When computer system 100 is initialized, then booster 330 may set an expiry time of each of the fourth idle start worker and the fourth idle end worker.

When a fourth idle task is executed in fourth core 210-4, then fourth idle module 350-4 may call the fourth idle start worker callback registered in fourth idle module 350-4. When the fourth idle task is executed in fourth core 210-4, then the fourth idle start worker callback may cancel a schedule of an idle start worker(s) already existing in a fourth work queue 380-4.

When: (1) an idle start worker is not pending in fourth work queue 380-4 and an idle end worker is not pending in fourth work queue 380-4, or (2) an idle start worker is not pending in fourth work queue 380-4 and fourth core 210-4 is being boosted, then the fourth idle start worker callback may schedule the fourth idle start worker.

Fourth work queue 380-4 may determine whether an expiry time of the fourth idle start worker is expired (or elapsed). After the expiry time of the fourth idle start worker is expired (or elapsed), the fourth idle start worker may decrease a busy core count of fourth core 210-4 by one, and transmit a decrease instruction event EVENTD to booster 330.

When an execution of the fourth idle task is ended in fourth core 210-4, then fourth idle module 350-4 may call the fourth idle end worker callback registered in fourth idle module 350-4.

When: (1) an idle end worker is not pending in fourth work queue 380-4 and an idle start worker is pending in fourth work queue 380-4, or (2) an idle end worker in not pending in fourth work queue 380-4 and fourth core 210-4 is not being boosted, then the fourth idle end worker callback may schedule the fourth idle end worker.

Fourth work queue 380-4 may determine whether an expiry time of the fourth idle end worker is expired (or elapsed). After the expiry time of the fourth idle end worker is expired (or elapsed), then the fourth idle end worker may cancel a schedule of an idle start worker scheduled in fourth work queue 380-4, increase a busy core count of fourth core 210-4 by one, and transmit an increase instruction event EVENTD to booster 330.

When at least one of the events EVENTA, EVENTB, EVENTC, and EVENTD is broadcast to booster 330, then a thread in a standby state is awakened by a kernel system call API and booster 330 may parse at least one received event. When the at least one event is parsed, then booster 330 may check (or determine) a busy core count of each of cores 210-1, 210-2, 210-3, and 210-4. Booster 330 may set (or write) a QoS minimum value corresponding to a total busy core count corresponding to a result of the check in QoS related system file 337. QoS controller 340 may generate control signals CTR_C and CTR_P for controlling a QoS minimum value of each of cores 210-1, 210-2, 210-3, and 210-4 based on a QoS minimum value output from QoS related system file 337.

A first clock signal CLK1 collectively represents clock signals CLK1_1 to CLK1_4, and a first operating voltage PW1 collectively represents operating voltages PW1_1 to PW1_4. However, CMU 220 may control a frequency of each of the clock signals CLK1_1 to CLK1_4 based on a frequency control signal CTR_C. Moreover, PMU 230 may generate a control signal CTR for controlling levels of each of the operating voltages PW1_1 to PW1_4 based on a power control signal CTR_P and output the control signal CTR to PMIC 270.

Each of the events EVENTA, EVENTB, EVENTC, and EVENTD may represent a decrease instruction event EVENT1 or an increase instruction event EVENT2, described referring to FIG. 3.

Each of load trackers 310-1, 310-2, 310-3, and 310-4 of each of cores 210-1, 210-2, 210-3, and 210-4 is the same as or similar to load tracker 310 described referring to FIGS. 3 to 9 in structure and function. Each of idle modules 350-1, 350-2, 350-3, and 350-4 of each of cores 210-1, 210-2, 210-3, and 210-4 is the same as or similar to idle module 350 described referring to FIGS. 3 to 9 in structure and function. Each of work queues 380-1, 380-2, 380-3, and 380-4 of each of cores 210-1, 210-2, 210-3, and 210-4 is the same as or similar to work queue 380 described referring to FIGS. 3 to 9 in configuration and function.

Figure 11:
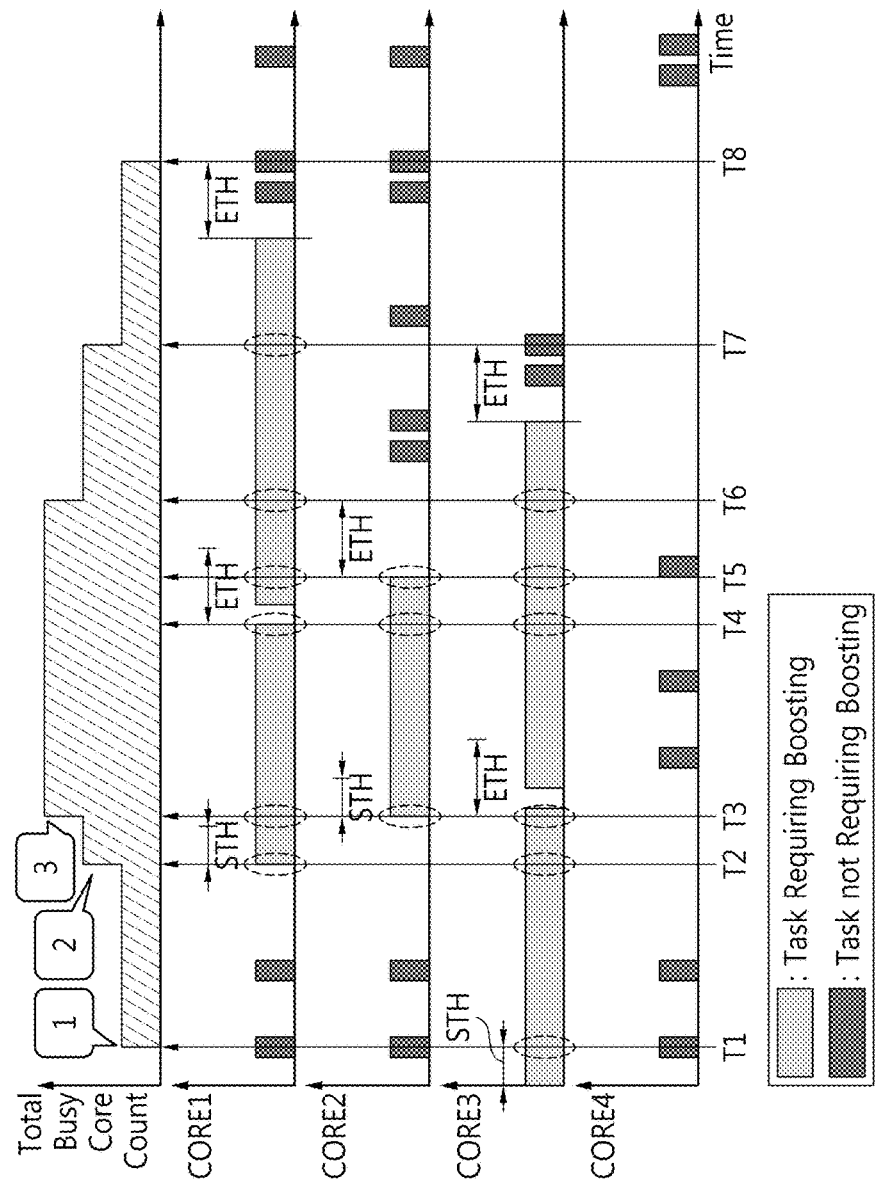
FIG. 11 is a conceptual diagram which describes methods of controlling a boosting level performed using the CPU shown in FIG. 10.

FIG. 11 is a conceptual diagram which describes methods of controlling a boosting level performed using CPU 210B shown in FIG. 10. Referring to FIGS. 10 and 11, an idle start worker of respective load trackers 310-1, 310-2, 310-3, and 310-4 of each of cores 210-1, 210-2, 210-3, and 210-4 may perform an operation of decreasing a busy core count, and an idle end worker of respectively load trackers 310-1, 310-2, 310-3, and 310-4 may perform an operation of increasing a busy core count. Here, a busy core count represents the number of cores to be boosted.

For example, when an idle task is executed in each of cores 210-1, 210-2, 210-3, and 210-4, a busy core count for each of cores 210-1, 210-2, 210-3, and 210-4 may be decreased, and when an idle task is ended in each of cores 210-1, 210-2, 210-3, and 210-4, a busy core count for each of cores 210-1, 210-2, 210-3, and 210-4 may be increased.

Booster 330 executed in first core 210-1 may parse each of the events EVENTA, EVENTB, EVENTC, and EVENTD, and calculate a total busy core count for CPU 210B according to a result of the parsing.

As shown in FIG. 11, when only a third core CORE3 (210-3) executes a task requiring boosting at a first time T1, third load tracker 310-3 of third core CORE3 (210-3) transmits an increase instruction event EVENTC=EVENT2 to booster 330, and thus a total busy core count calculated by booster 330 is one.

When first core CORE1 210-1 performs a task requiring boosting at a second time T2, first load tracker 310-1 of first core CORE1 210-1 transmits an increase instruction event EVENTA=EVENT2 to booster 330, and thereby a total busy core count calculated by booster 330 is two.

When second core CORE2 210-2 performs a task requiring boosting at a third time T3, second load tracker 310-2 of second core CORE2 210-2 transmits an increase instruction event EVENTB=EVENT2 to booster 330, and thereby a total busy core count calculated by booster 330 is three. A total busy core count calculated by booster 330 is still three at a fourth time T4.

When ETH is not expired or elapsed as described referring to FIG. 4 even if second core CORE2 210-2 ends a task requiring boosting at a fifth time T5, a total busy core count calculated by booster 330 may be maintained to be three. Since second load tracker 310-2 of second core CORE2 210-2 transmits a decrease instruction event EVENTB=EVENT1 to booster 330 at a sixth time T6, after ETH is expired or elapsed. In response thereto, a total busy core count calculated by booster 330 may be decreased from three to two.

After a third core CORE3 ends a task requiring boosting and ETH is expired or elapsed at a seventh time T7, a third load tracker 310-3 of third core CORE3 transmits a decrease instruction event EVENTC=EVENT1 to booster 330, and thereby a total busy core count calculated by booster 330 may be decreased from two to one.

At an eighth time T8, that is, after the first core CORE1 ends a task requiring boosting and ETH is expired or elapsed, first load tracker 310-1 of the first core CORE1 transmits a decrease instruction event EVENTA=EVENT1 to booster 330, and thereby a total busy core count calculated by booster 330 may be decreased from one to zero. Each of STH and ETH shown in FIG. 11 is the same as each of STH and ETH described referring to FIG. 4.

Figure 12:
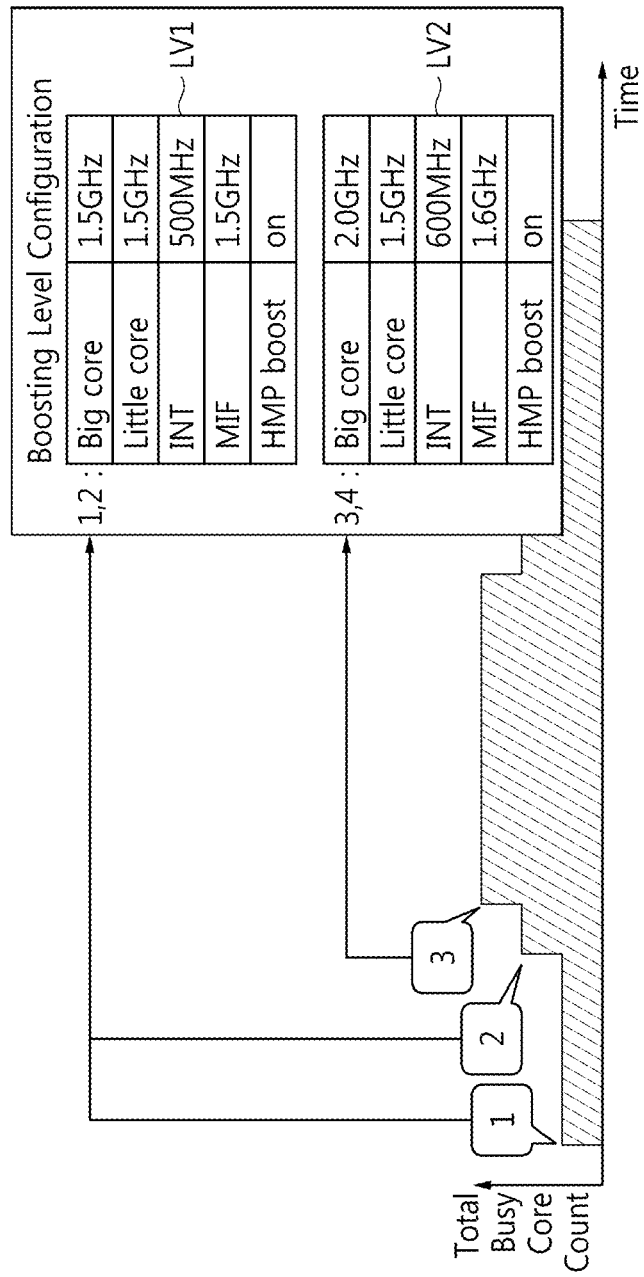
FIG. 12 is a conceptual diagram which describes the methods of controlling a boosting level performed using the CPU shown in FIG. 10.

FIG. 12 is a conceptual diagram which describes exemplary embodiments of methods of controlling a boosting level performed using CPU 210B shown in FIG. 10. Referring to FIGS. 4, 10, 11, and 12, it is assumed that a boosting level when a total busy core count is one or two is level-1 (LV1), and a boosting level when the total busy core count is three or four is level-2 (LV2).

It is assumed that each of first core 210-1 and second core 210-2 shown in FIG. 10 is a little core, and each of third core 210-3 and fourth core 210-4 is a big core. In FIG. 12, it is assumed that MIF is at least one of memory interfaces 250 and 260 shown in FIG. 1, and INT is an input/output interface 265 shown in FIG. 1. As described referring to FIGS. 10 and 11, booster 330 executed by first core 210-1 may calculate a total busy core count based on each of the events EVENTA, EVENTB, EVENTC, and EVENTD output from each of cores 210-1, 210-2, 210-3, and 210-4.

Booster 330 of first core 210-1 may set a QoS minimum value in QoS related system file 337 based on the total busy core count calculated. Accordingly, QoS controller 340 may generate control signals CTR_C and CTR_P for controlling a QoS minimum value. CMU 220 may control a frequency of at least one clock signal among the clock signals CLK1_1, CLK1_2, CLK1_3, CLK1_4, CLK2, CLK3, CLK4, and CLK5 in response to the frequency control signal CTR_C.

For example, when a boosting level is the level-1 (LV1), then CMU 220 may adjust a frequency of a clock signal supplied to the big core to be 1.5 GHz and adjust a frequency of a clock signal supplied to the little core to be 1.5 GHz, adjust a frequency of a clock signal supplied to the INT to be 500 MHz, adjust a frequency of a clock signal supplied to the MIF to be 1.5 GHz, and turn on a HMP boost. When the HMP boost is turned on, a task assigned to the little core may be compulsorily assigned to the big core.

For example, when the boosting level is the level-2 (LV2), then CMU 220 may adjust the frequency of a clock signal supplied to the big core to be 2.0 GHz, adjust the frequency of a clock signal supplied to the little core to be 1.5 GHz, adjust the frequency of a clock signal supplied to the INT to be 600 MHz, adjust the frequency of a clock signal supplied to the MIF to be 1.6 GHz, and turn on the HMP boost.

Figure 13:
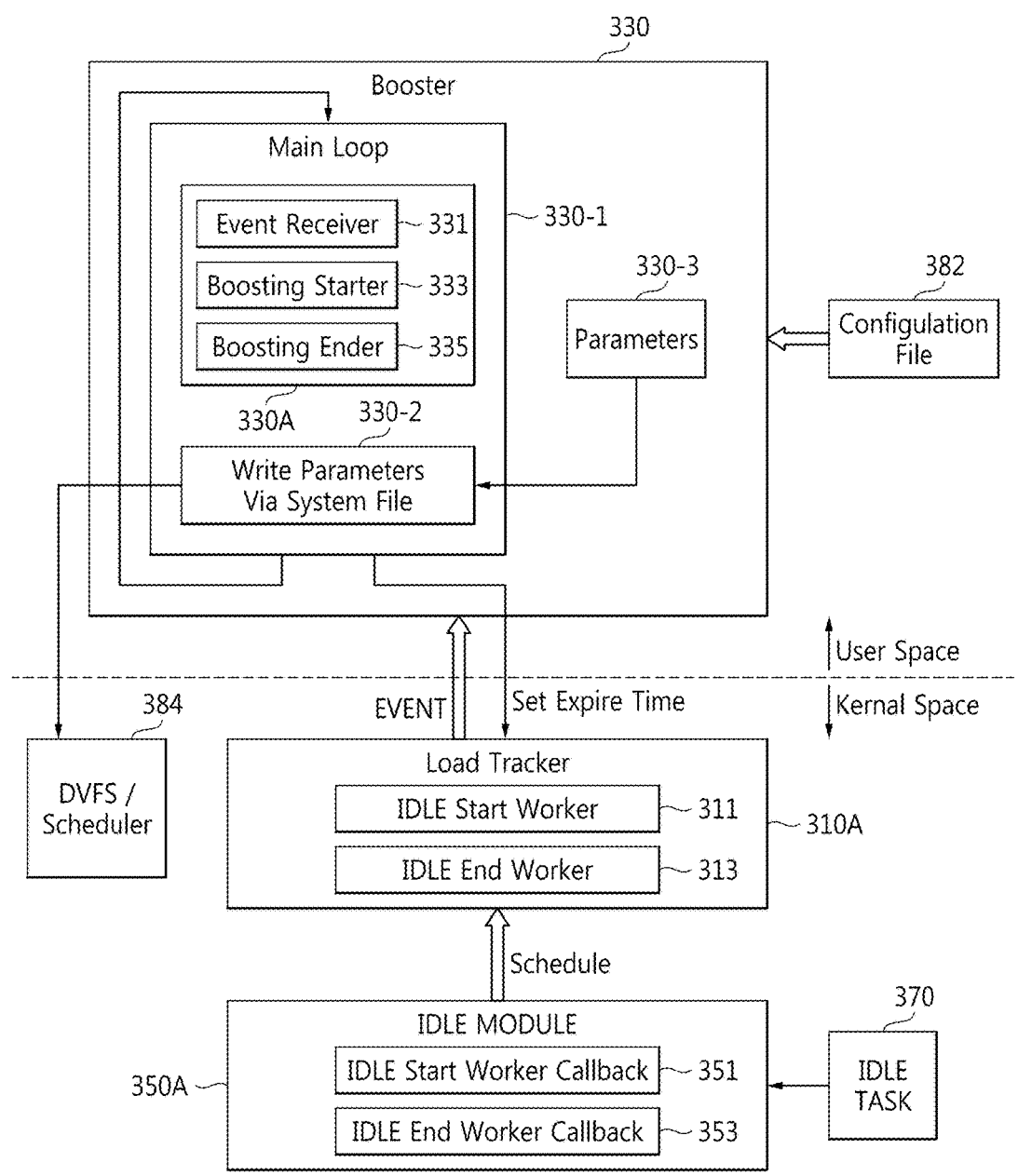
FIG. 13 is a conceptual diagram which describes methods of controlling a QoS minimum value using software components executed by the CPU shown in FIG. 10.
Figure 14:
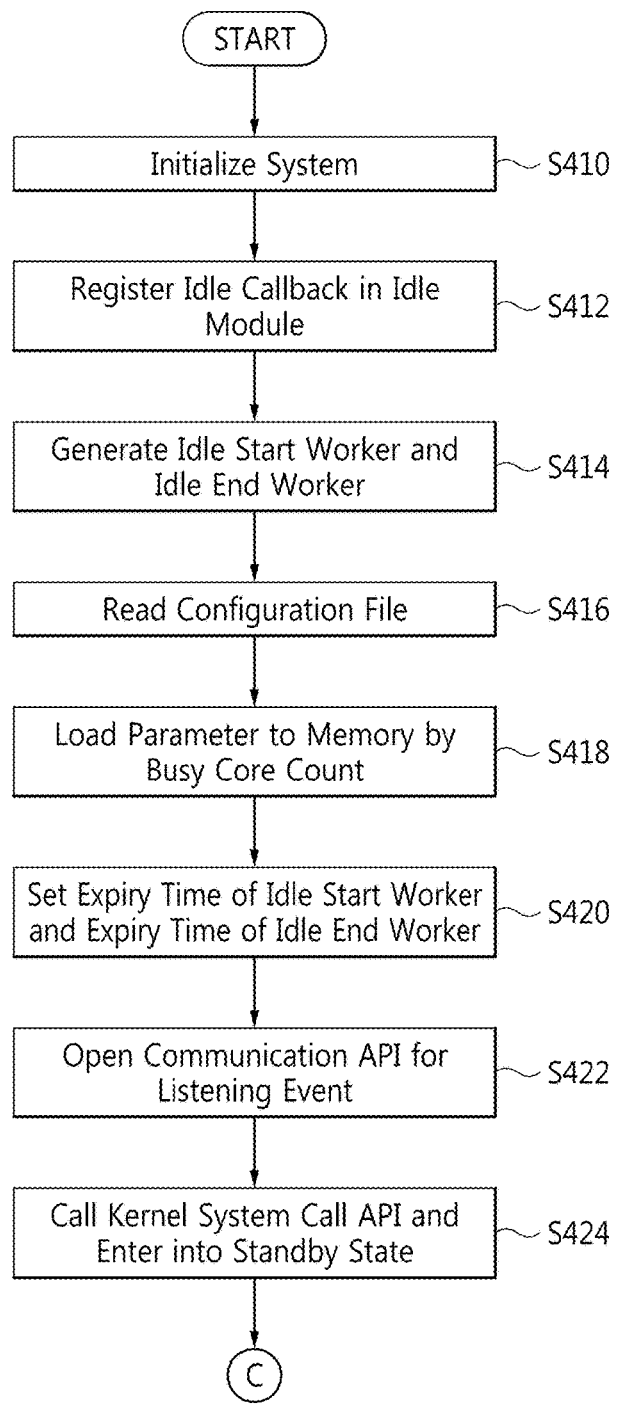
FIGS. 14, 15, and 16 are flowcharts which describe exemplary embodiments of methods of controlling a QoS minimum value using the software components executed by the CPU shown in FIG. 10.
Figure 15:
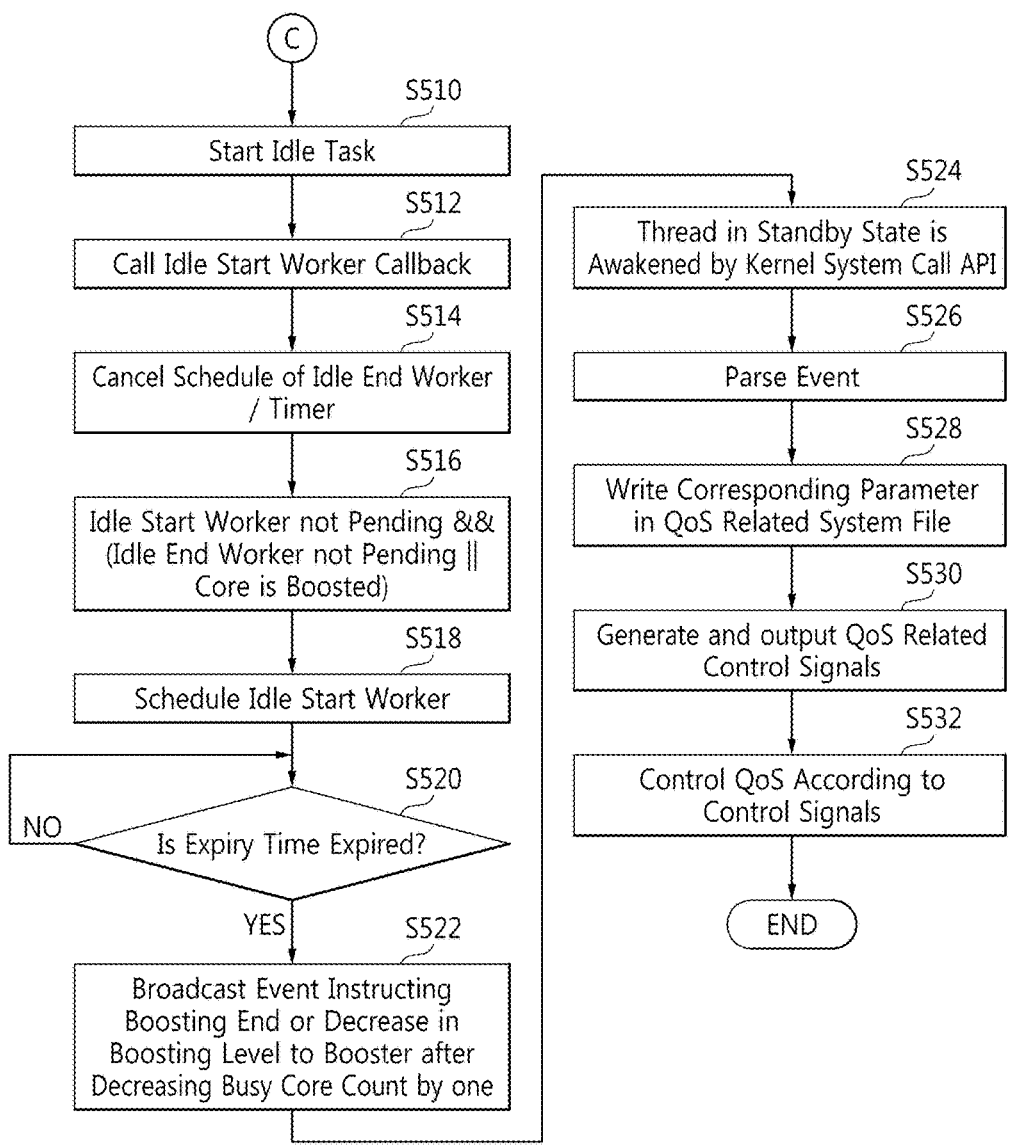
Figure 16:
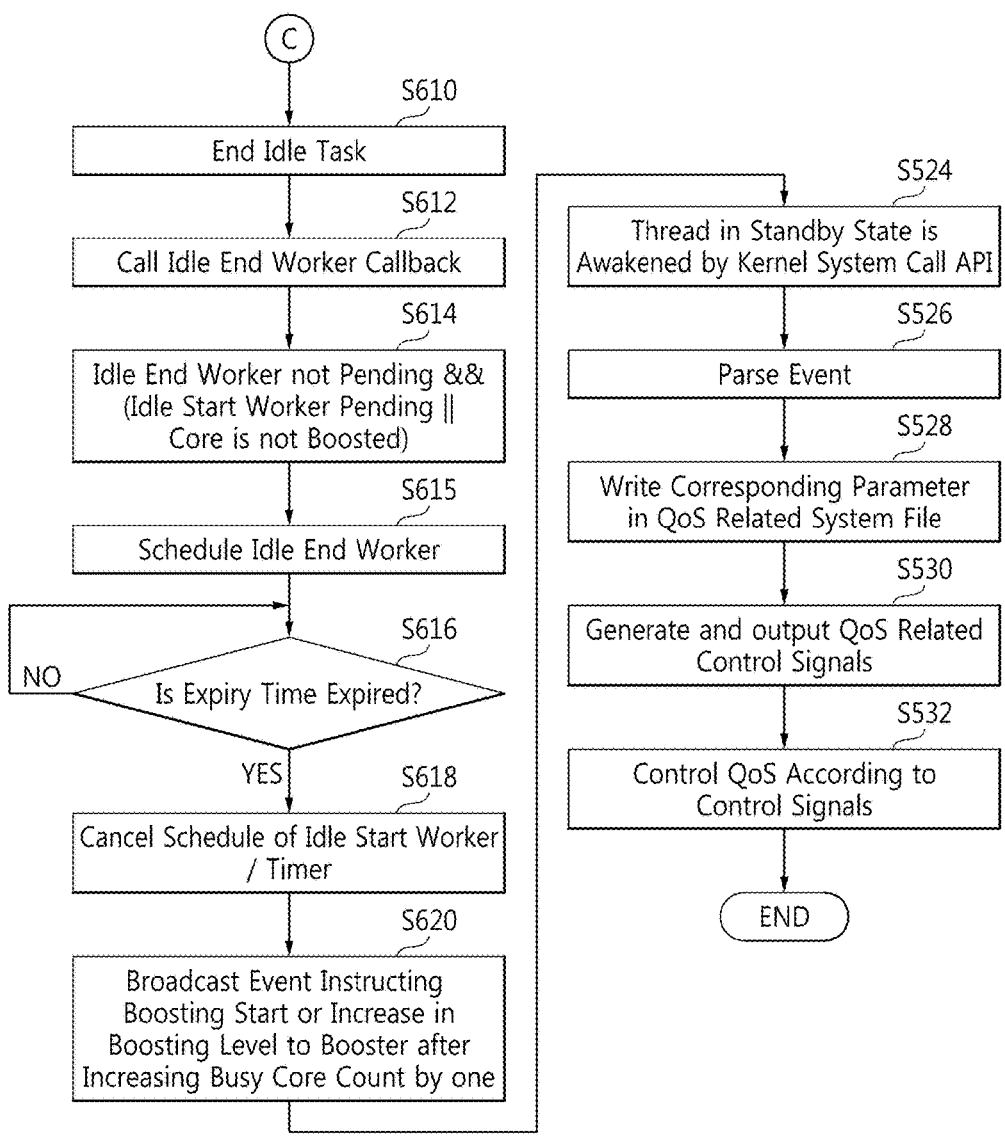

FIG. 13 is a conceptual diagram which describes exemplary embodiments of methods of controlling a QoS minimum value using software components performed by CPU 210B shown in FIG. 10, and FIGS. 14, 15, and 16 are flowcharts which describe exemplary embodiments of methods of controlling a QoS minimum value using software components performed by CPU 210B shown in FIG. 10.

Referring to FIGS. 1 to 3, 10, and 13 to 16, when computer system 100 is initialized (or booted) (S410), then load tracker 310, 310-1, 310-2, 310-3, or 310-4 (collectively, 310A) may register idle worker callbacks, for example, idle start worker callback 351 and idle end worker callback 353, for a corresponding core 211 210-1, 210-2, 210-3, or 210-4 in idle module 350, 350-1, 350-2, 350-3, or 350-4 (collectively, 350A) (S412).

Load tracker 310A may generate idle start worker 311 and idle end worker 313 for a corresponding core 211, 210-1, 210-2, 210-3, or 210-4 (S414).

When computer system 100 is initialized, then booster 330 may read a configuration file 382 from second memory device 290 (S416), and load parameters 330-3 to be set in a scheduler 384 and/or a DVFS (or DFS) to memory device 215 or 280 through a system file 330-2 by busy core count or by total busy core count (S418). For example, configuration file 382 may be a boosting level configuration exemplarily shown in FIG. 12; however, it is not limited thereto. Booster 330 shown in FIG. 13 may include a main loop 330-1, and main loop 330-1 may include a booster 330A including an event receiver 331, a boosting starter 333, and a boosting ender 335. For example, booster 330 and booster 330A may include a data flow; however, a function of booster 330 may be the same as that of booster 330A.

Booster 330 may set an expiry time of each of idle start worker 311 and idle end worker 313 generated by load tracker 310A (S420). For example, booster 330 may set each of the expiry times STH and ETH shown in FIG. 4.

Booster 330 may open a communication application programming interface (API) for receiving or listening an event EVENT1, EVENT2, EVENTA, EVENTB, EVENTC, and/ or EVENTD (collectively, EVENT) from a kernel or a kernel region (S422). The communication API may refer to a socket. The communication API or socket may refer to a communication channel for transmitting or receiving an event EVENT including a busy core count.

Booster 330 may open the communication API, and may call a kernel system call API of the communication API and enter into a standby state (S424).

When idle task 370 is started (S510), then idle module 350A may call idle start worker callback 351 (S512).

Idle start worker callback 351 may cancel a schedule (or an expiry time of a timer) of an idle end worker existing in work queue 380, 380-1, 380-2, 380-3, and/or 380-4 (collectively, 380) (S514). As described above, when an idle end worker to be cancelled does not exist in work queue 380, then process S514 will be omitted or skipped.

When: (1) an idle start worker is not pending in work queue 380 and an idle end worker is not pending in work queue 380, or (2) an idle start worker is not pending in work queue 380 and a corresponding core 211, 210-1, 210-2, 210-3, or 210-4 is being boosted (S516), then idle start worker callback 351 may schedule an idle start worker 311 (S518).

Work queue 380 may determine whether an expiry time of an idle start worker 311 is expired (or elapsed) (S520). When the expiry time of an idle start worker 311 is expired (or elapsed) (YES in S520), then idle start worker 311 may decrease a busy core count of a corresponding core 211, 210-1, 210-2, 210-3, or 210-4 by one, and broadcast a decrease instruction event EVENT instructing a boosting end or a decrease in a boosting level to booster 330 (S522).

When the decrease instruction event EVENT is broadcast to booster 330, then a thread in a standby state may be awakened by a kernel system call API (for example, epoll) of booster 330 (S524). For example, event receiver 331 of main loop 330-1 may receive a decrease instruction event EVENT transmitted from load tracker 310A, parse the decrease instruction event EVENT (S526), and call boosting ender 335 according to a result of the parsing.

Boosting ender 335 may write a parameter(s) corresponding to a QoS minimum value in QoS related system file 337 according to a result of the parsing (S528). QoS controller 340 may read a parameter(s) corresponding to a QoS minimum value from QoS related system file 337, generate control signals CTR_C and CTR_P related QoS of a corresponding core 211, 210-1, 210-2, 210-3, or 210-4 using the parameter(s), and output the control signals CTR_C and CTR_P (S530).

Control circuit 200 may control a QoS or QoS minimum value of control circuit 200 according to a control of CMU 220 and PMU 230 operating based on the control signals CTR_C and CTR_P (S532). That is, CMU 220 may adjust a frequency of at least one of the clock signals CLK1, CLK2, CLK3, CLK4, and CLK5 based on the frequency control signal CTR_C. PMIC 270 may adjust a level of at least one of the operating voltages PW1, PW2, PW3, PW4, PW5, and PW6 based on a control signal CTR related to the power control signal CTR_P.

As described above referring to FIG. 10, CMU 220 may adjust a frequency of at least one of the clock signals CLK1_1, CLK1_2, CLK1_3, and CLK1_4 based on the frequency control signal CTR_C. PMIC 270 may adjust a level of at least one of the operating voltages PW1_1, PW1_2, PW1_3, and PW1_4 based on the control signal CTR related to the power control signal CTR_P. Continuously referring to FIGS. 13, 14, and 16, when an execution of idle task 370 is ended (S610), then an idle module 350A may call an idle end worker callback 358 (S612).

When: (1) an idle end worker is not pending in work queue 380 and an idle start worker is pending in work queue 380, or (2) an idle end worker is not pending in work queue 380 and a corresponding core 211, 210-1, 210-2, 210-3, or 210-4 is not being boosted (S614), then idle end worker callback 353 may schedule an idle end worker 313 (S615).

Work queue 380 may determine whether an expiry time of idle end worker 313 is expired (or elapsed) (S616). When the expiry time of an idle end worker is expired (or elapsed) (YES in S616), then idle end worker 313 may cancel or erase a schedule (an expiry time of a timer) of an idle start worker for a corresponding core 211, 210-1, 210-2, 210-3, or 210-4 (S618).

Idle end worker 313 may increase a busy core count for a corresponding core 211, 210-1, 210-2, 210-3, or 210-4 by one, and broadcast an increase instruction event EVENT instructing a boosting start or an increase in boosting level to booster 330 (S620).

When the increase instruction event EVENT is broadcast to booster 330, then a thread in a standby state may be awakened by the kernel system call API (for example, epoll) of booster 330 (S524). For example, event receiver 331 of main loop 330-1 may receive an increase instruction event EVENT transmitted from load tracker 310A, parse the increase instruction event EVENT (S526), and call boosting starter 333 according to a result of the parsing.

Boosting starter 333 may write a parameter(s) corresponding to a QoS minimum value in QoS related system file 337 according to a result of the parsing (S528). QoS controller 340 may read the parameter(s) corresponding to a QoS minimum value from QoS related system file 337, generate control signals CTR_C and CTR_P related Qos of a corresponding core 211, 210-1, 210-2, 210-3, or 210-4 using the parameter(s), and output the control signals CTR_C and CTR_P (S530).

Control circuit 200 may control a QoS or a QoS minimum value of control circuit 200 according to a control of CMU 220 and PMU 230 operating based on the control signals CTR_C and CTR_P (S532). That is, CMU 220 may adjust a frequency of at least one of the clock signals CLK1, CLK2, CLK3, CLK4, and CLK5 based on the frequency control signal CTR_C. PMIC 270 may adjust a level of at least one of the operating voltages PW1, PW2, PW3, PW4, PW5, and PW6 based on the control signal CTR related to the power control signal CTR_P. As described referring to FIG. 10, CMU 220 may adjust a frequency of at least one of the clock signals CLK1_1, CLK1_2, CLK1_3, and CLK1_4 based on the frequency control signal CTR_C. PMIC 270 may adjust a level of at least one of the operating voltages PW1_1, PW1_2, PW1_3, and PW1_4 based on the control signal CTR related to the power control signal CTR_P.

FIG. 17 is an exemplary embodiment of program code for describing a process of registering an idle worker callback in an idle module shown in FIG. 3. Referring to FIG. 17, a program code exemplarily shown in FIG. 17 represents a portion of code for registering idle worker callbacks, e.g., an idle start worker callback and an idle end worker callback, in an idle module.

FIG. 18 is an exemplary embodiment of program code for describing a schedule process and a cancellation process of an idle start worker and an idle end worker in the idle worker callback registered in the idle module shown in FIG. 3. Referring to FIG. 18, program code exemplarily shown in FIG. 18 represents a portion of code in which an idle start worker callback schedules and cancels an idle start worker, and a portion of code in which an idle end worker callback schedules and cancels an idle end worker.

As described referring to FIGS. 1 to 18, in CPU 210 or computer system 100 including CPU 210 in which an idle task is executed when a core does not operate, an idle start worker is scheduled when the idle task is executed, and an idle end worker is scheduled when an execution of the idle task is ended.

When the idle task is executed, then a schedule of the idle end worker is cancelled. When a schedule of each of a scheduled idle start worker and a scheduled idle end worker is not cancelled and an expiry time of the scheduled idle start worker is expired or elapsed, or the scheduled idle end worker is expired or elapsed, then an operation designated for the scheduled idle start worker may be performed or an operation designated for the scheduled idle end worker may be performed.

An operation designated for an idle start worker is to broadcast an event of lowering a boosting level to booster 330, and an operation designated for an idle end worker is to broadcast an event of increasing a boosting level to booster 330. Booster 330 listens for the event in real time. When booster 330 receives an event, an operation defined in advance for the received event is performed. The operation defined in advance may include a start of boosting, an end of boosting, a change of boosting level, a control of an operation of at least one of peripheral devices 240, 250, 260, and 265 related to boosting, and/or an operation dependent on an OS executed by computer system 100.

A method of operating a CPU according to an exemplary embodiment of the present inventive concepts can automatically sense when a high performance is urgently required and automatically set a QoS minimum value according to a result of the sensing. The method of operating a CPU according to an exemplary embodiment of the present inventive concepts can detect an occurrence of a load based on an interrupt without periodically polling the load of a CPU.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of operating a central processing unit (CPU) including a first memory for storing a first load tracker and a booster and a first core for executing the first load tracker and the booster, the method comprising:
   determining, by the first load tracker, whether a first idle task executed in the first core;
   generating, by the first load tracker, a first event instructing a boosting end or a decrease in a boosting level of the first core when the first idle task is executed and instructing a boosting start or an increase in the boosting level of the first core when the first idle task is not executed;
   broadcasting, by the first load tracker, the first event to the booster;
   setting, by the booster, a quality of service (QoS) minimum value of the first core based on the first event; and
   outputting, by the booster, control signals for dynamic voltage frequency scaling (DVFS) of the first core to a QoS controller based on the set QoS minimum value of the first core based on the first event.

2. The method of claim 1, further comprising:
   registering when the CPU is initialized, by the first load tracker, an idle start worker callback and an idle end worker callback in an idle module, and
   generating when the CPU is initialized, by the first load tracker, an idle start worker and an idle end worker.

3. The method of claim 2, further comprising:
   setting when the CPU is initialized, by the booster, a first expiry time of the idle start worker and a second expiry time of the idle end worker.

4. The method of claim 3, further comprising:
   calling, by the idle module, the idle start worker callback when the first idle task is executed; and
   calling, by the idle module, the idle end worker callback when the first idle task is ended.

5. The method of claim 1, further comprising:
   generating, by the QoS controller, a frequency control signal related to a frequency control of an operating clock signal of the first core and a voltage control signal related to a control of an operating voltage of the first core.

6. The method of claim 1, wherein the CPU further includes a second memory for storing a second load tracker and a second core for executing the second load tracker, the method of operating a CPU further comprising:
   determining, by the second load tracker, whether a second idle task is executed in the second core;
   generating, by the second load tracker, a second event instructing a boosting end or a decrease in a boosting level of the second core when the second idle task is executed and instructing a boosting start or an increase in the boosting level of the second core when the second idle task is not executed;
   broadcasting, by the second load tracker, a generated second event to the booster executed in the first core; and
   setting, by the booster, a QoS minimum value of the first core and a QoS minimum value of the second core based on the first event and the second event.

7. A method of operating a system on a chip which includes: a CPU having a first memory for storing a first load tracker, a booster, and a QoS controller, and further having a first core for executing the first load tracker, the booster, and the QoS controller; a clock management unit; and a power management unit, the method comprising:
   determining, by the first load tracker, whether a first idle task is currently being executed in the first core;
   generating, by the first load tracker, a first event instructing a boosting end or a decrease in a boosting level of the first core when the first idle task is executed and instructing a boosting start or an increase in the boosting level of the first core when the first idle task is not executed;
   broadcasting, by the first load tracker, the first event to the booster;
   setting, by the booster, a quality of service (QoS) minimum value of the first core based on the first event, the QoS minimum value of the first core being for controlling dynamic voltage frequency scaling (DVFS) of the first core;

outputting, by the booster to the QoS controller, control signals for the DVFS of the first core based on the set QoS minimum value of the first core based on the first event;

outputting, by the QoS controller, in response to the control signals from the booster, a frequency control signal and a voltage control signal based on the set QoS minimum value; and controlling, by the clock management unit, a first frequency of a first clock signal supplied to the first core in response to the frequency control signal; and outputting, by the power management unit, a control signal for controlling a power management IC for supplying a first operating voltage to the first core in response to the voltage control signal.

8. The method of claim 7, further comprising:

registering when the CPU is initialized, by the first load tracker, an idle start worker callback and an idle end worker callback in an idle module; and generating when the CPU is initialized, by the first load tracker, an idle start worker and an idle end worker.

9. The method of claim 8, further comprising:

calling, by the idle module, the idle start worker callback when the first idle task is executed; and calling, by the idle module, the idle end worker callback when the first idle task is ended.

10. The method of claim 9, further comprising:

canceling, by the idle start worker callback, a schedule of a previous idle end worker existing in a work queue when the first idle task is executed;

determining, by the idle start worker callback, a schedule prerequisite of the idle start worker; and scheduling, by the idle start worker callback, the idle start worker when the schedule prerequisite is satisfied.

11. The method of claim 9, further comprising:

determining, by the idle end worker callback, a schedule prerequisite of the idle end worker when the first idle task is ended; and scheduling, by the idle end worker callback, the idle end worker when the schedule prerequisite is satisfied.

12. The method of claim 11, wherein the schedule prerequisite includes a case in which the idle end worker is not pending and the idle start worker is pending, and a case in which the idle end worker is not pending and the first core is not boosted.

13. The method of claim 11, further comprising canceling, by the idle end worker, a schedule of the idle start worker when an expiry time of the idle end worker is expired.

14. The method of claim 7, wherein the CPU further includes a second memory for storing a second load tracker and a second core for executing the second load tracker, and the method further comprising:

determining, by the second load tracker, whether a second idle task is executed in the second core;

generating, by the second load tracker, a second event instructing a boosting end or a decrease in a boosting level of the second core when the second idle task is executed and instructing a boosting start or an increase in the boosting level of the second core when the second idle task is not executed;

broadcasting, by the second load tracker, the second event to the booster executed in the first core;

setting, by the booster, a set QoS minimum value of the first core and a set QoS minimum value of the second core based on the first event and the second event;

outputting, by the QoS controller, the frequency control signal and the voltage control signal based on the set QoS minimum value of the first core and the set QoS minimum value of the second core;

controlling, by the clock management unit, the first frequency of the first clock signal supplied to the first core and a second frequency of a second clock signal supplied to the second core in response to the frequency control signal; and outputting, by the power management unit, the control signal for controlling the power management IC for supplying the first operating voltage to the first core and a second operation voltage to the second core in response to the voltage control signal.

* * * * *